(12) United States Patent
Rao

(10) Patent No.: US 10,587,055 B1
(45) Date of Patent: Mar. 10, 2020

(54) IMAGING REFLECTOR ANTENNA SYSTEM AND METHOD

(71) Applicant: Northrop Grumman Systems Corporation, Falls Church, VA (US)

(72) Inventor: Sudhakar K. Rao, Rancho Palos Verdes, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/504,984

(22) Filed: Jul. 8, 2019

(51) Int. Cl.
| | | |
|---|---|---|
| H01Q 3/00 | (2006.01) | |
| H01Q 3/26 | (2006.01) | |
| H01Q 25/00 | (2006.01) | |
| H01Q 5/47 | (2015.01) | |
| H01Q 15/24 | (2006.01) | |
| H01Q 15/16 | (2006.01) | |
| H01Q 19/17 | (2006.01) | |

(52) U.S. Cl.
CPC ......... *H01Q 25/007* (2013.01); *H01Q 3/2664* (2013.01); *H01Q 5/47* (2015.01); *H01Q 15/16* (2013.01); *H01Q 15/244* (2013.01); *H01Q 19/17* (2013.01)

(58) Field of Classification Search
CPC .... H01Q 25/007; H01Q 19/17; H01Q 15/244; H01Q 3/2664; H01Q 5/47; H01Q 15/16; H01Q 3/00; H01Q 3/26

USPC .......................................... 343/700 MS, 702
See application file for complete search history.

(56) References Cited

U.S. PATENT DOCUMENTS

| | | | |
|---|---|---|---|
| 7,034,771 B2 | 4/2006 | Rao et al. | |
| 9,503,131 B2* | 11/2016 | Berejik | .............. H01Q 13/0241 |
| 2004/0189538 A1* | 9/2004 | Rao | ........................ H01Q 1/288 |
| | | | 343/757 |
| 2005/0052333 A1* | 3/2005 | Rao | ........................ H01Q 19/17 |
| | | | 343/840 |
| 2016/0372835 A1* | 12/2016 | Toso | .................... H01Q 19/192 |

OTHER PUBLICATIONS

S. Rao, "Design and Analysis of Multiple Beam Antennas", IEEE Antennas and Propagation Magazine, vol. 41, pp. 53-59, Aug. 1999.

* cited by examiner

*Primary Examiner* — Hai V Tran
(74) *Attorney, Agent, or Firm* — McCracken & Gillen LLC

(57) ABSTRACT

An antenna system includes: an antenna, the antenna configured to combine the feed elements to form a high gain element beam (HGEB), the system further configured to combine the HGEBs to form a large coverage beam; and a feed array configured to transfer a signal to the antenna, the feed array being defocused from a focal plane of the antenna by a defocus distance, the feed array comprising a number N of feed elements.

20 Claims, 20 Drawing Sheets

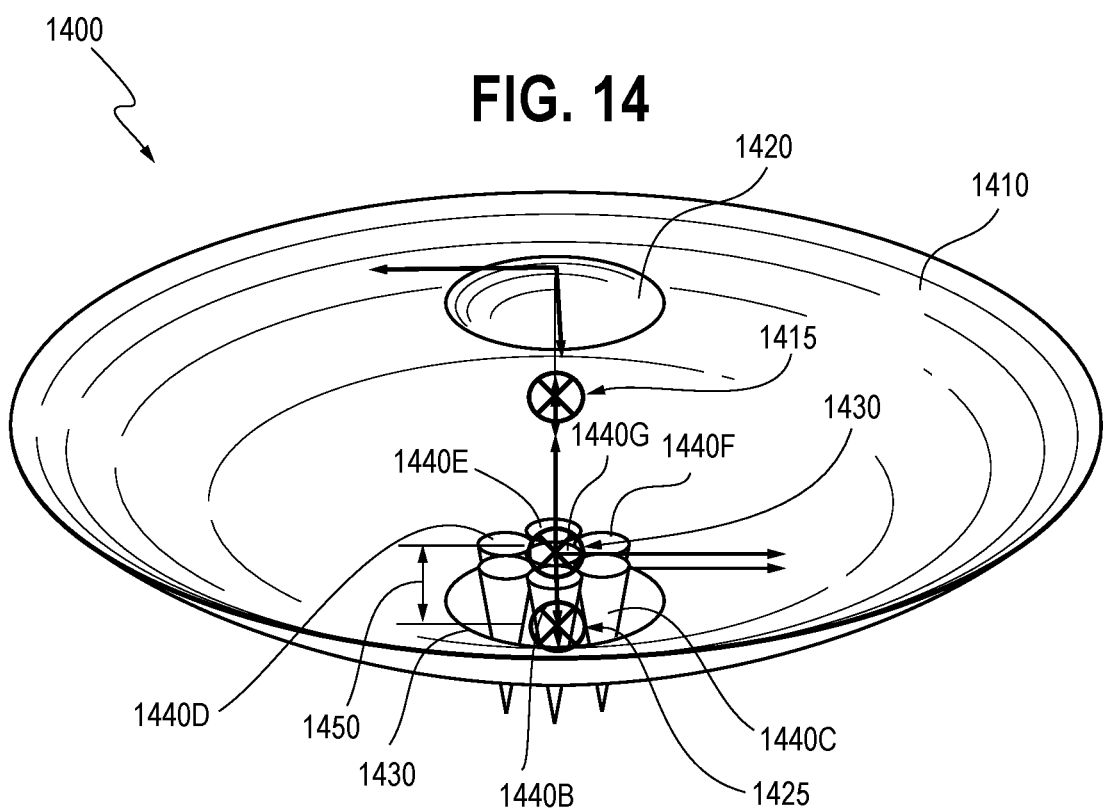

FIG. 18

1810: sing an antenna system, the system comprising a single reflector imaging antenna (SRIA), and using a feed array comprising a number N of feed elements, the feed array configured to transfer a signal to the antenna, the feed array being defocused from a focal plane of the antenna by a defocus distance, the antenna configured to combine the feed elements to form a number M of medium gain element beams (MGEBs), the antenna further configured to combine the MGEBs to form a number J of high gain element beams (HGEBs), and the system further configured to combine all or some number of MGEBs to form a large coverage beam, using the N feed elements and the antenna, forming N single element beams.

1820: Using the N feed elements, combining the single element beams. This does not require any beam-forming network.

1830: Forming M MGEBs using a first-level beamforming network (BFN).

1840: Combining the MGEBs in a second-level BFN to create the large coverage beam.

1910 Using an antenna system, the system comprising an antenna, the antenna comprising a single reflector imaging antenna (SRIA), the system further comprising a two-axis gimbal mechanism, the system further comprising a feed array configured to transfer a signal to the antenna, the feed array being defocused from a focal plane of the antenna by a defocus distance, the feed array comprising a number N of feed elements, the antenna configured to combine the feed elements to form a number J of high gain element beam (HGEBs), the system further configured to combine the HGEBs to form a large coverage beam, performing precise electronic scanning over a first region, generating the J HGEBs and the large coverage beam.

1920 Perform coarse mechanical scanning over a second region using the two-axis gimbal mechanism by keeping the feed array fixed and gimballing the reflector antenna, wherein the second region is larger than the first region, generating J second level beams and a large coverage beam.

1930 Coarse mechanical scanning is performed over a second region using the two-axis gimbal mechanism by keeping the feed array fixed and gimballing the reflector antenna, wherein the second region is larger than the first region, generating a number J of second level beams.

IMAGING REFLECTOR ANTENNA SYSTEM AND METHOD

SUMMARY

An antenna system includes: an antenna, the antenna configured to combine the feed elements to form a high gain element beam (HGEB), the system further configured to combine the HGEBs to form a large coverage beam; and a feed array configured to transfer a signal to the antenna, the feed array being defocused from a focal plane of the antenna by a defocus distance, the feed array comprising a number N of feed elements. For example, the signal comprises a radio frequency (RF) signal.

A method for beam scanning includes: using an antenna system, the system comprising a single reflector imaging antenna (SRIA), and using a feed array comprising a number N of feed elements, the feed array configured to transfer a signal to the antenna, the feed array being defocused from a focal plane of the antenna by a defocus distance, the antenna configured to combine the feed elements to form a number M of medium gain element beams (MGEBs), the antenna further configured to combine the MGEBs to form a number J of high gain element beams (HGEBs), and the system further configured to combine all or some number of MGEBs to form a large coverage beam, using the N feed elements and the antenna, forming N single element beams; combining the N single element beams, using the N feed elements; forming M MGEBs in a first level beam forming network (BFN); and combining the MGEBs in a second level BFN to create the large coverage beam.

A method for beam scanning includes: using an antenna system, the system comprising an antenna, the antenna comprising a single reflector imaging antenna (SRIA), the system further comprising a two-axis gimbal mechanism, the system further comprising a feed array configured to transfer a signal to the antenna, the feed array being defocused from a focal plane of the antenna by a defocus distance, the feed array comprising a number N of feed elements, the antenna configured to combine the feed elements to form a number J of high gain element beam (HGEB), the system further configured to combine the HGEBs to form a large coverage beam, performing precise electronic scanning over a first region, generating the J HGEBs and the large coverage beam; and performing coarse mechanical scanning over a second region using the two-axis gimbal mechanism by keeping the feed array fixed and gimballing the reflector antenna, wherein the second region is larger than the first region, generating J second level beams and a large coverage beam.

An antenna system includes: a single reflector imaging antenna (SRIA), the antenna configured to combine the feed elements to form a high gain element beam (HGEB), the system further configured to combine the HGEBs to form a large coverage beam; a two-axis gimbal mechanism placed on a back of the SRIA antenna; and a feed array configured to transfer a signal to the antenna, the feed array being defocused from a focal plane of the antenna by a defocus distance, the feed array comprising a number N of feed elements, the feed array further comprising a number N of polarizers, the feed array further comprising a number N of filters, the feed array further comprising a number N of amplifiers, the amplifiers configured to pass the signal to a first level beamforming network (BFN), the first level BFN configured to combine the feed elements to form a number M of medium gain element beams (MGEBs), the feed array further comprising M post-first level BFN amplifiers, the feed array further comprising N local oscillator/mixers, the feed array further comprising a second level digital BFN configured to combine the MGEBs to form a number J of outgoing high gain element beams (HGEBs), the system further configured to combine the HGEBs to form the large coverage beam.

An antenna system includes: a dual reflector imaging antenna (DRIA), the system comprising a main reflector, the system further comprising a sub-reflector; and a feed array configured to transfer a signal to the antenna, the feed array being defocused from a focal plane of the antenna by a defocus distance, the feed array configured to receive a number N of feed elements, the feed array passing the N signals through a first level beamforming network (BFN), the feed array further comprising a number N of attenuators, the feed array further comprising a number N of phase shifters, the feed array further comprising a number 3N of amplifiers, the feed array further comprising a number N of triplexers, the feed array further comprising a number 3N of polarizers, the feed array further comprising a number 3N of filters, the feed array further comprising a number N of amplifiers, the system further configured to combine the beams to simultaneously form a large global coverage beam and a high gain scanning spot beam.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 14 is a drawing of components of a dual reflector imaging antenna (DRIA) system.

FIG. 18 is a flow chart of a method for beam scanning.

FIG. 19 is a flow chart of a method for beam scanning.

DETAILED DESCRIPTION

An antenna system allowing on-orbit beam reconfiguration is provided using high gain multiple beams (HGMB) employing imaging reflector antennas. Beam scanning over global coverage is achieved using a combination of precise electronic scanning over a small region and coarse mechanical scanning over a larger global coverage. This method provides significant improvements in gain relative to prior art methods that employ element beams and can simultaneously provide both HGMBs and wide area coverage beams with low cost payloads.

Embodiments of the invention provide high gain multiple overlapping spot beams by combining all feed elements of an imaging reflector antenna with optimized excitations to form high gain element beams (HGEBs). The HGEBs are then combined to form one or more of a larger coverage beam and an adapted beam capable of mitigating one or more jammers.

The system combines a number N of low-gain element beams into a number M of medium gain element beams (MGEBs). The system then combines the M MGEBs into a number J of high-gain element beams. The combination of the N feed elements increases antenna gains of the N beams by approximately 2.0 dB to 3.0 dB relative to the prior art. A hybrid scanning method combines electronic scanning over a smaller region and mechanical scanning over a larger region using a two-axis gimbal mechanism, keeping the feed array fixed and gimballing the reflector antenna.

The N feed element excitations (both amplitude and phase) are used to scan the set of N element beams to a desired scan location in a N element beam cluster. The beams are then combined to form M MGEBs first and then are combined again using the MGEBs to form J HGEBs. A single antenna provides both high gain multiple beams and a theater coverage beam.

Figure 1:
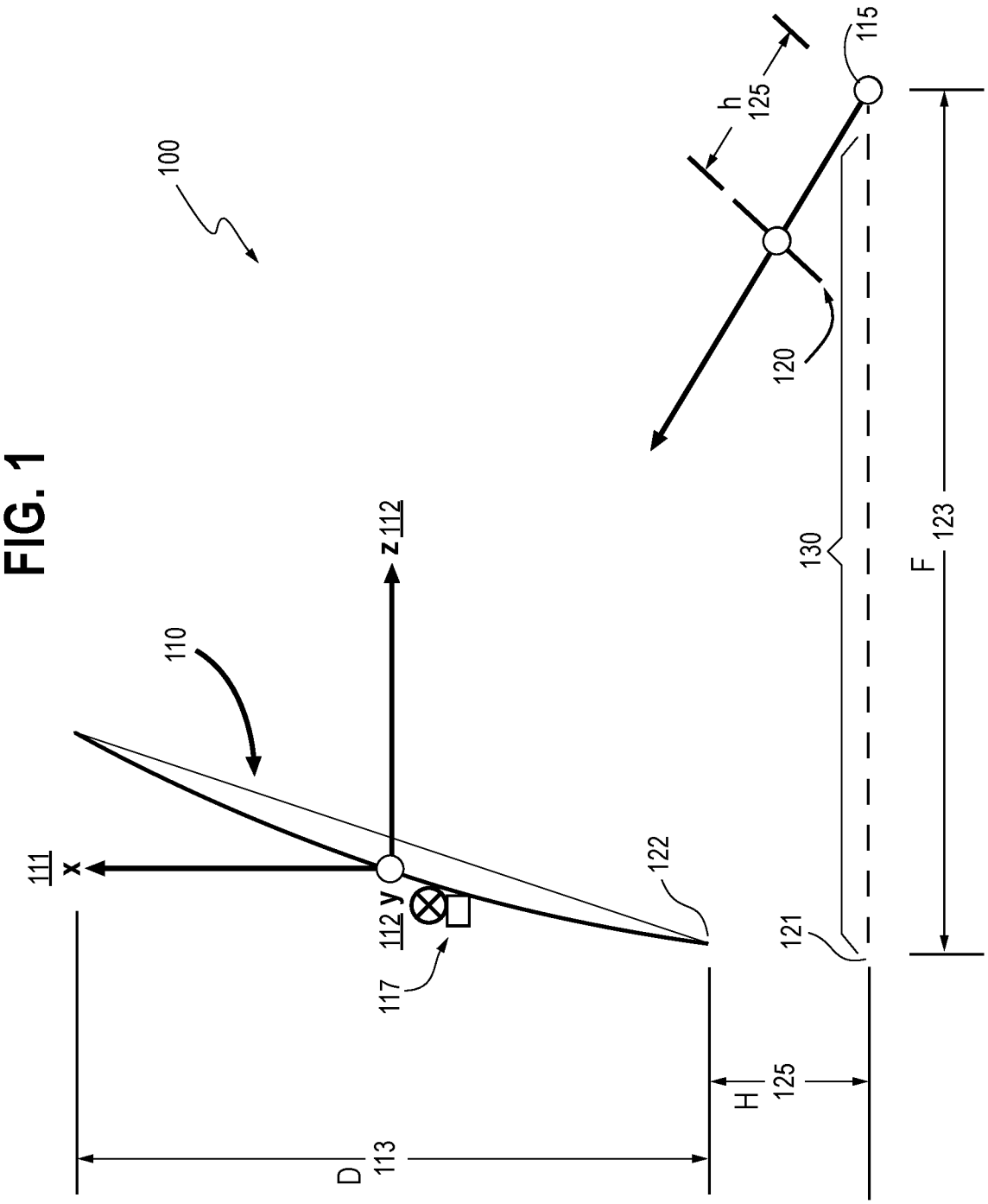
FIG. 1 is a drawing of components of a single reflector imaging antenna (SRIA) system.

FIG. 1 is a drawing of components of a single reflector imaging antenna (SRIA) system 100. The system 100 comprises a single offset reflector antenna 110. For example, the single offset reflector antenna 110 comprises a single offset paraboloid reflector antenna 110. Depicted are orthogonal coordinate axes x 111, y 112 (extending perpendicularly out of the page), and z 113. The antenna 110 has a diameter D 114. The antenna 110 has a focal point 115. Optionally, the system further comprises a two-axis gimbal mechanism 117 and uses a hybrid scanning method.

The system 100 further comprises a feed array 120 configured to exchange power with the antenna 110. For example, the feed array comprises seven elements. The feed array 120 is positioned at a feed array-focus distance h 125 from the focal point 115. The focal point 115 lies on an axis 130. For example, and as depicted, the focal point 115 lies on a generally paraboloid axis 130. The axis 130 has a first end at the focal point 115. The axis 130 has a second end 131 at a point below a near end 132 of the antenna 110 and having the same x coordinate as the near end of the antenna 110. The axis 130 has a focal length F 133.

The feed array 120 is defocused from the focal plane by a defocus distance H 135 equal to a distance along the x axis from the focal point 115 to the near end 132 of the antenna 110. According to embodiments of the invention, the feed array 120 is moved away from the focal plane in order to improve adjacent beam overlap so that the system can use more elements for each beam. This causes defocusing of the element beam from the feed array 120, which allows element beams to broaden, improving adjacent beam overlap. An array of feed elements is used to form each beam. Using a first level beamforming network, this improves beam efficiency to approximately 50% from 14%. Then a second level of beamforming is used to improve beam efficiency to approximately 80%.

Exemplary antenna geometrical parameters are D=129λ, focal length F/D=1.2, and defocus distance H=51.65λ, where λ is the wavelength at mid-band of low frequency. The feed array is defocused from the focal plane by a defocus distance. As a result of the defocusing, the element beams broaden, depending on the defocus distance, resulting in increased overlap between adjacent beams. Element beams typically have lower gain due to non-optimal illumination on the reflector. By combining a number of element beams, a certain number of medium gain element beams (MGEB) are formed. Subsequently, a certain number of high gain element beams (HGEB) are formed and these HGEBs are then used to form either an adapted beam creating nulls in the location of interferers or a theater coverage with higher gain. Use of HGEBs instead of element beams provides a much better ratio of gain-to-noise-temperature (G/T) on the uplink or better Effective Isotropic Radiated Power (EIRP) on the downlink. As discussed below in regards to FIGS. 7 and 8, the ratio of G/T represents an approximate improvement over the prior art of 2.2 decibels (dB).

Single Reflector Imaging Antenna (SRIA)

The feed array in an imaging reflector antenna is displaced from the focal point, that is, defocused. This broadens the element beam and improves the adjacent beam overlap, allowing use of large number of element beams to form high gain multiple beams (HGMB). Improved gain is achieved due to optimal illumination on the reflector when compared to single element beam. The HGMBs can be electronically scanned over a small theater coverage. Use of HGMBs allows interference cancellation from several jammers and also enables to form a large theater coverage.

Figure 2:
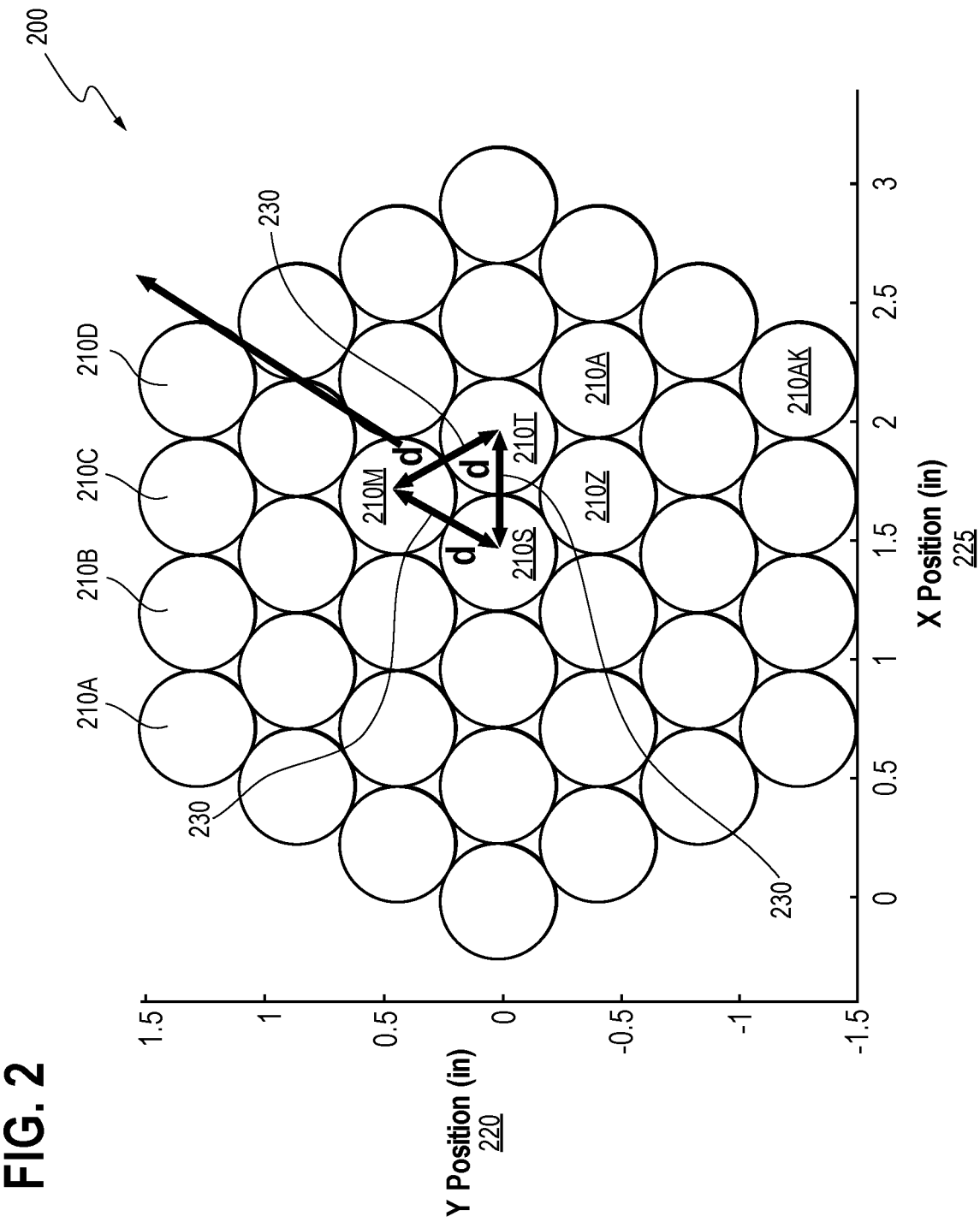
FIG. 2 is a drawing of a feed array usable with a single reflector imaging antenna (SRIA) system.

FIG. 2 is a drawing of a feed array 200 usable with a single reflector imaging antenna (SRIA) system (not shown). An exemplary feed array 200 is shown with 37 elements 210A . . . 210Z, 210AA . . . 210AK feeding the reflector antenna (not shown). The 37 elements 210A . . . 210Z, 210AA . . . 210AK of the array 200 are arranged in a hexagonal lattice 200. Also provided are a vertical scale 220 and a horizontal scale 225 indicating dimensions of the 37 elements 210A . . . 210Z, 210AA . . . 210AK and dimensions of the feed array 200. For example, spacing d 230 between centers of adjacent elements 210M, 210S, 210T is approximately 0.49 inches.

Embodiments of the invention thereby achieve better overlap among adjacent beams than does the prior art. By combining a number of feed elements with optimized amplitude and optimized phase excitations, a broader beam in the far-field is generated with increased efficiency. For example, optimization is performed using General Reflector Antenna Software Package (GRASP) reflector antenna code sold by TICRA (www.ticra.com) of Copenhagen, Denmark.

Combining element beams is done in a two-step process: 1. A limited number of element beams is used, typically seven. The system uses a single element per beam. A low efficiency of approximately 15% results in this stage due to spillover losses. 1A. In an intermediate step, the computed element beams are combined using a first-level beamforming network (BFN) to form medium gain beams. 2. The beams formed in the first step(s) are combined in a second level BFN to create high gain multiple beams.

The feed array is designed to operate over dual-bands separated by a factor of 1.6 (center frequencies of high band and low band ratio) with an overall bandwidth of 20.5% with dual-CP capability at both bands.

Figure 3:
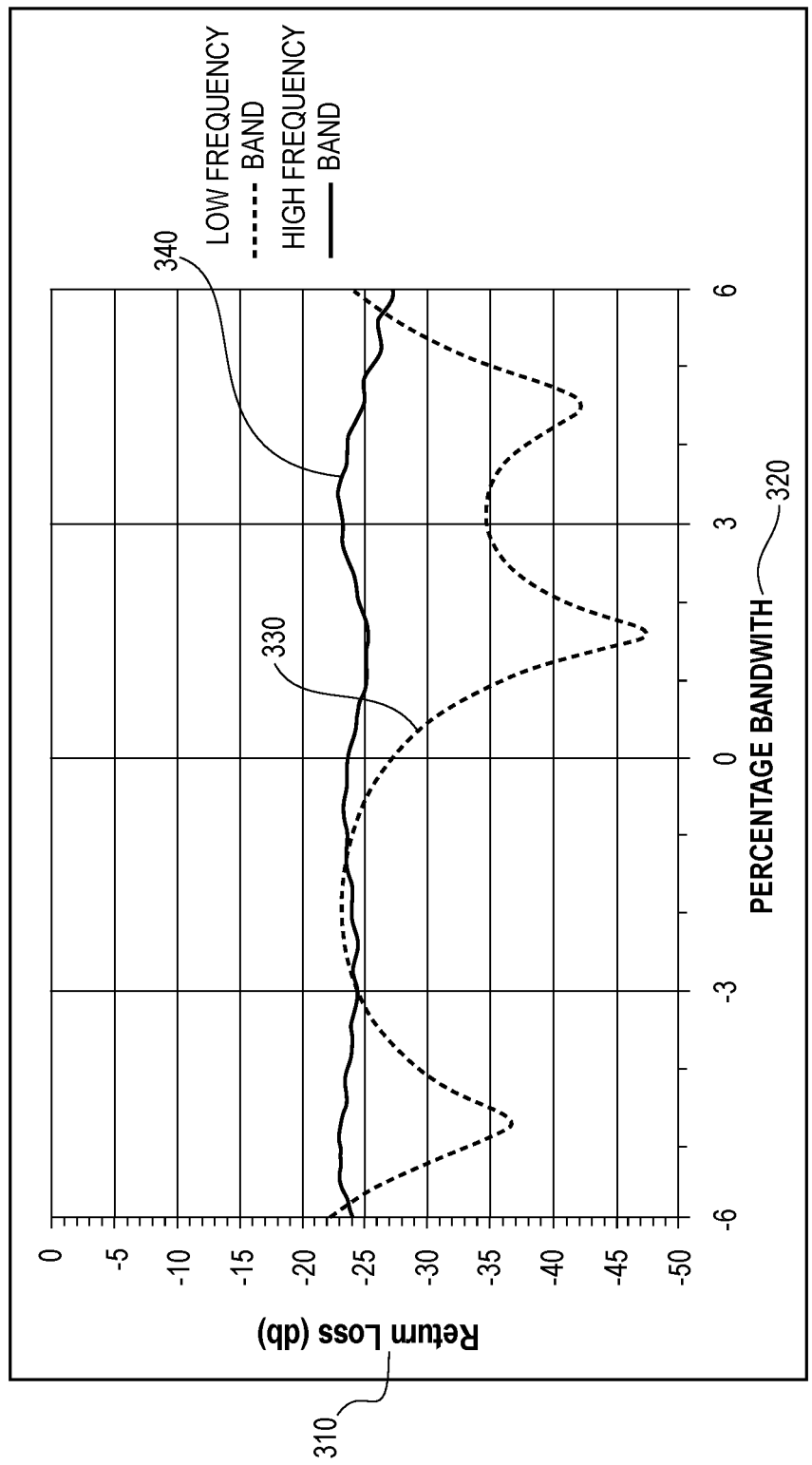
FIG. 3 is a graph plotting measured return loss of the integrated dual-band feed array against percentage bandwidth for the SRIA system.

FIG. 3 is a graph 300 plotting measured return loss 310 (in decibels [dB]) of the integrated dual-band feed array against percentage bandwidth 320 for the SRIA system. Depicted are the return loss 330 for a low frequency band 1 and the return loss 340 for a high frequency band 2. As mentioned above, the high frequency band 2 has a frequency of approximately 1.6 times the frequency of the low frequency band 1. The percentage bandwidth for the low frequency band 1 is +/−1.7% from the center frequency of the band. The percentage bandwidth for the high frequency band 2 is +/−2.5% from the center frequency of the band. For both bands, the measured return loss is better than 23 dB, meaning less than 1% of the signal is reflected back.

Figure 4:
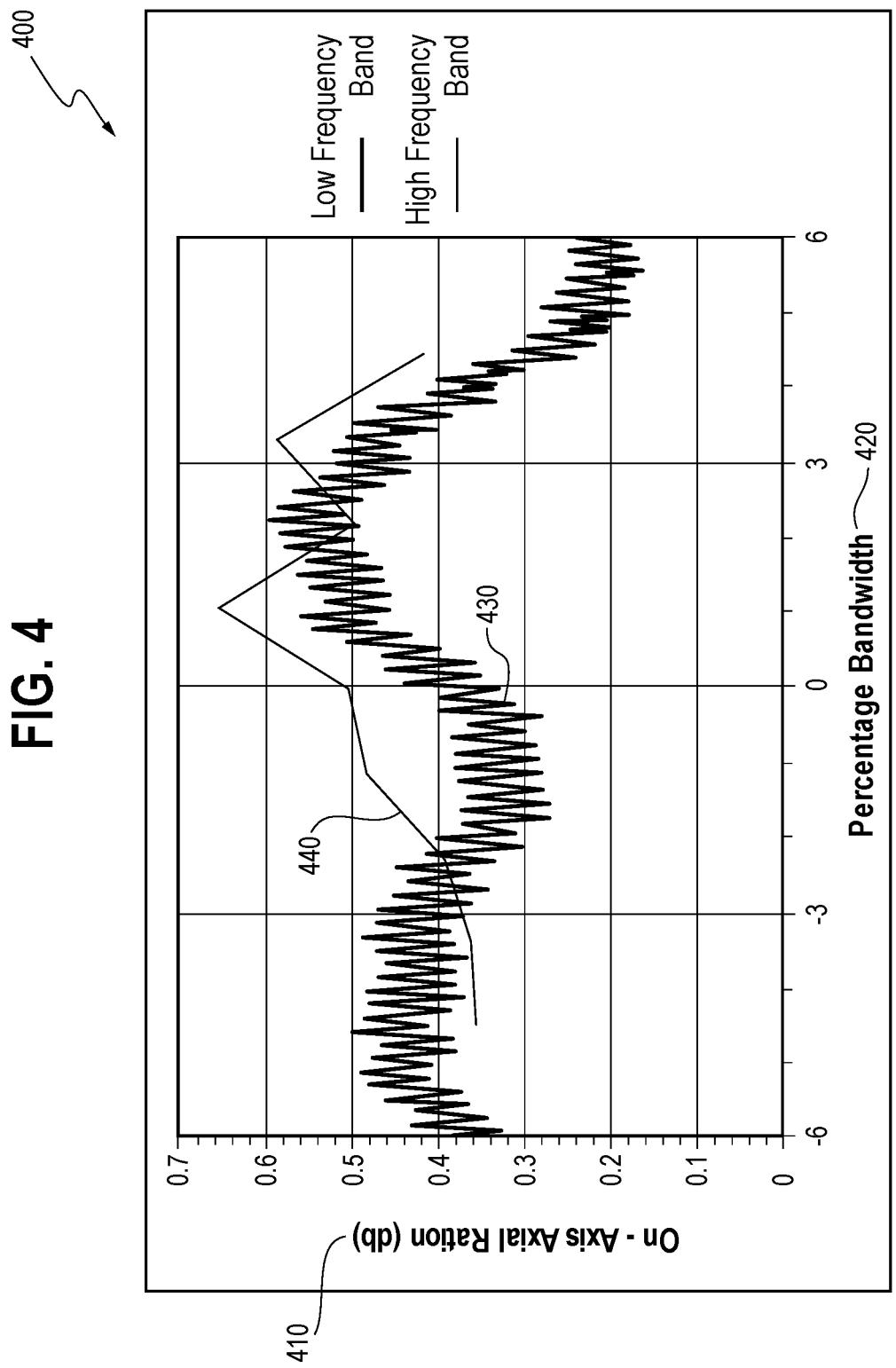
FIG. 4 is a graph plotting measured on-axis axial ratio of the integrated dual-band feed array against the percentage bandwidth for the SRIA system.

FIG. 4 is a graph 400 plotting measured on-axis axial ratio 410 (in dB) of the integrated dual-band feed array against the percentage bandwidth 420 for the SRIA system. Depicted are the axial ratio for the low frequency band 1 and for the high frequency band 2. As mentioned above, the high frequency band 2 has a frequency of approximately 1.6 times the frequency of the low frequency band 1. The measured axial ratio is better than 0.65 dB for both bands, which translates into cross-polar isolation of more than 28.5 dB. As shown by FIG. 4, embodiments of the invention significantly improve on representative prior art axial ratios of approximately 1.5 dB, which translates into cross-polar isolation of better than 21.3 dB.

Figure 5A:
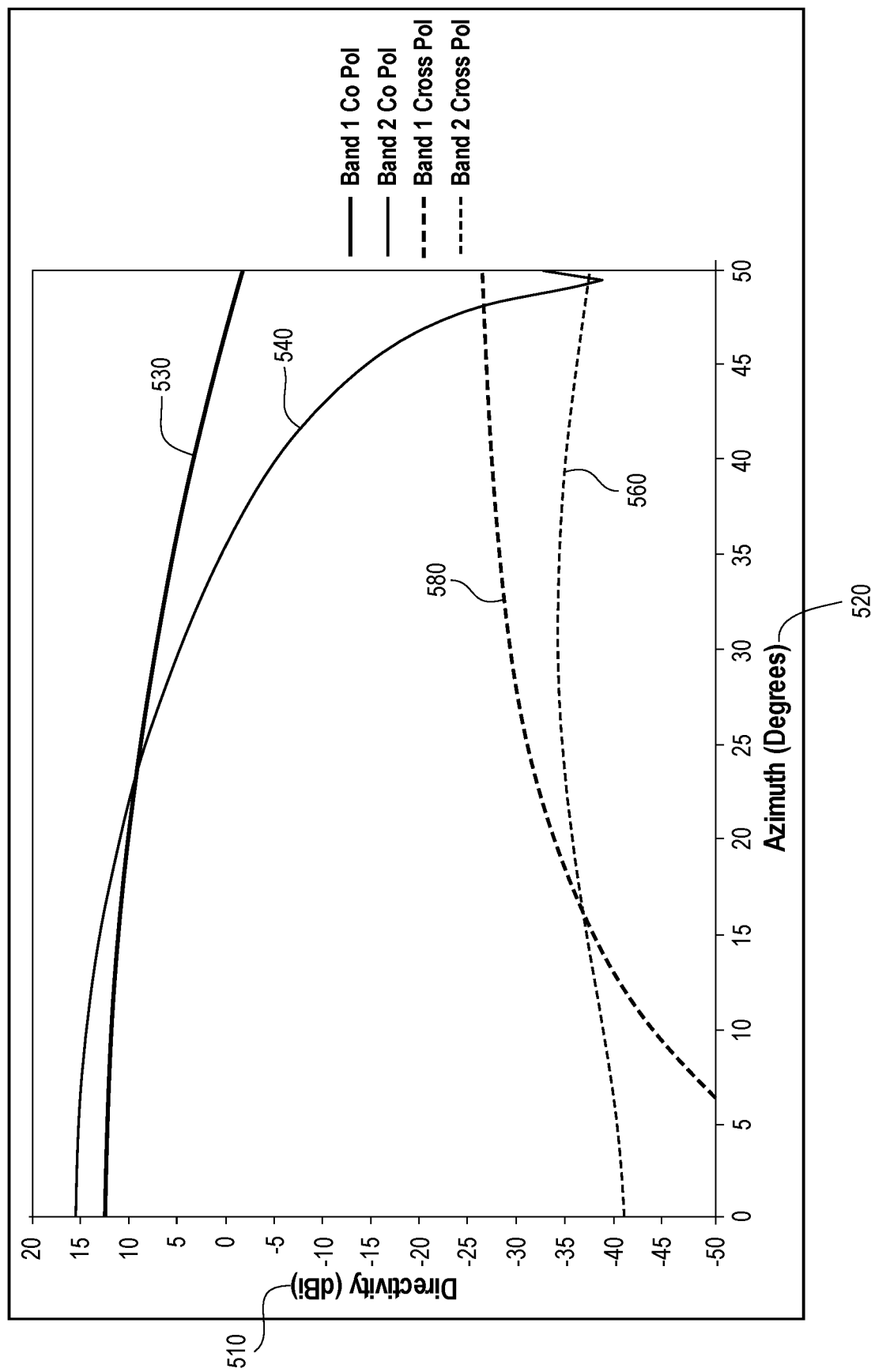
FIG. 5A is a graph plotting directivity of the integrated dual-band feed array against azimuth angle.

FIG. 5A is a graph 500 plotting directivity 510 (in decibels (isotropic) [dBi]) of the integrated dual-band feed array against azimuth (in degrees) 520. Depicted are feed element patterns measured in an anechoic chamber. Depicted are a co-polar pattern 530 for the low frequency band 1 and a co-polar pattern 540 for the high frequency band 2. As mentioned above, the high frequency band 2 has a frequency of approximately 1.6 times the frequency of the low frequency band 1. Also depicted are a cross-polar pattern 550 for the low frequency band 1 and a cross-polar pattern 560 for the high frequency band 2. The cross-polar patterns 550 and 560 show excellent cross-polar performance for both bands of better than approximately 30 dB. A single feed is defined as illuminating the main SRIA reflector. The measured feed patterns are used to compute the SRIA secondary element beam patterns.

Figure 5B:
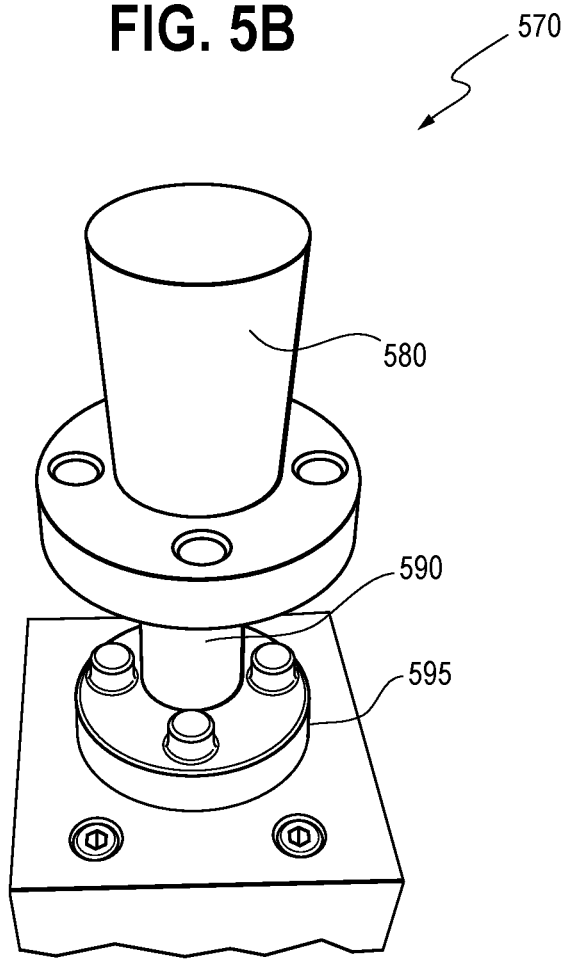
FIG. 5B is a drawing of a single feed assembly usable with embodiments of the invention.

FIG. 5B is a drawing of a single feed assembly 570 usable with embodiments of the invention. The feed array uses 37 such feed assemblies 570 tightly packed in a hexagonal grid to improve elemental beam overlap in the far-field. The feed assembly comprises a horn 580, a polarizer 590 and a diplexer 595. For example, the horn 580 comprises a multi-flare horn with an aperture diameter of approximately 1.19λ at the low frequency band 1. The diplexer 595 comprises a common waveguide junction, a low frequency reject filter, and a high frequency reject filter in order to provide desired isolation between the two frequency bands. For example, the one or more of the polarizer 590 and the diplexer 595 are configured to enable the feed assembly 570 to isolate the two frequency bands by at least approximately 50 dB of isolation.

Figure 6:
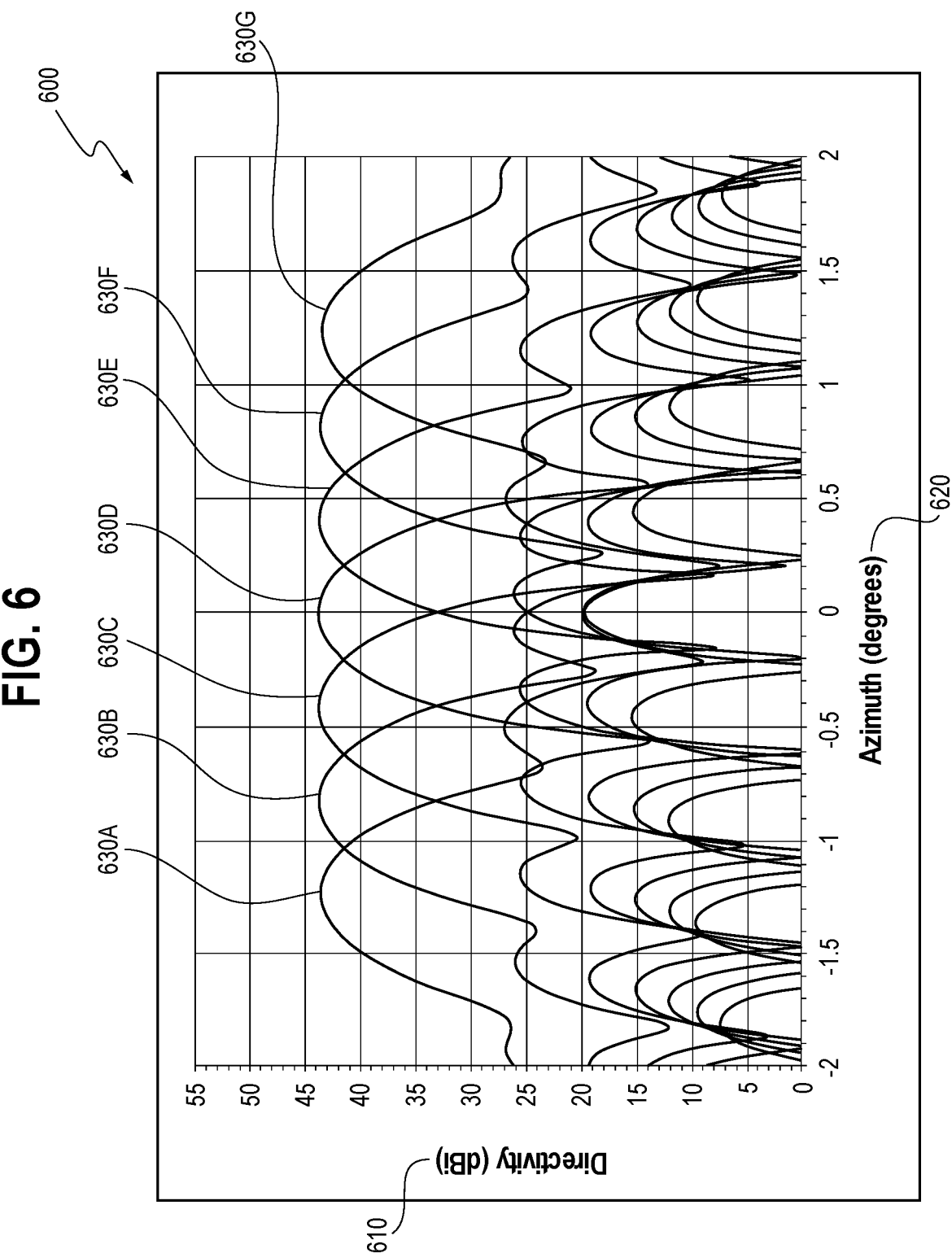
FIG. 6 is a graph plotting directivity of an SRIA system using an integrated dual-band feed array against azimuth angle for computed element beam patterns for the SRIA system for the low frequency band using a single feed per beam with no beam-forming network.

FIG. 6 is a graph 600 plotting directivity 610 (in dBi) of an SRIA system using an integrated dual-band feed array against azimuth angle (in degrees) 620 for computed element beam patterns for the SRIA system for the low frequency band using a single feed per beam with no beam-forming network. Depicted are seven computed element beam patterns 630A . . . 630G of the SRIA imaging reflector for the 7-feeds in the azimuth plane for the low frequency band 1, using a single feed per beam with no beam-forming network. The computed element beam patterns 630A . . . 630G show adjacent beam overlap, but with a low antenna efficiency of 14% due to a low illumination taper of approximately 3.0 dB on the reflector edge.

Figure 7:
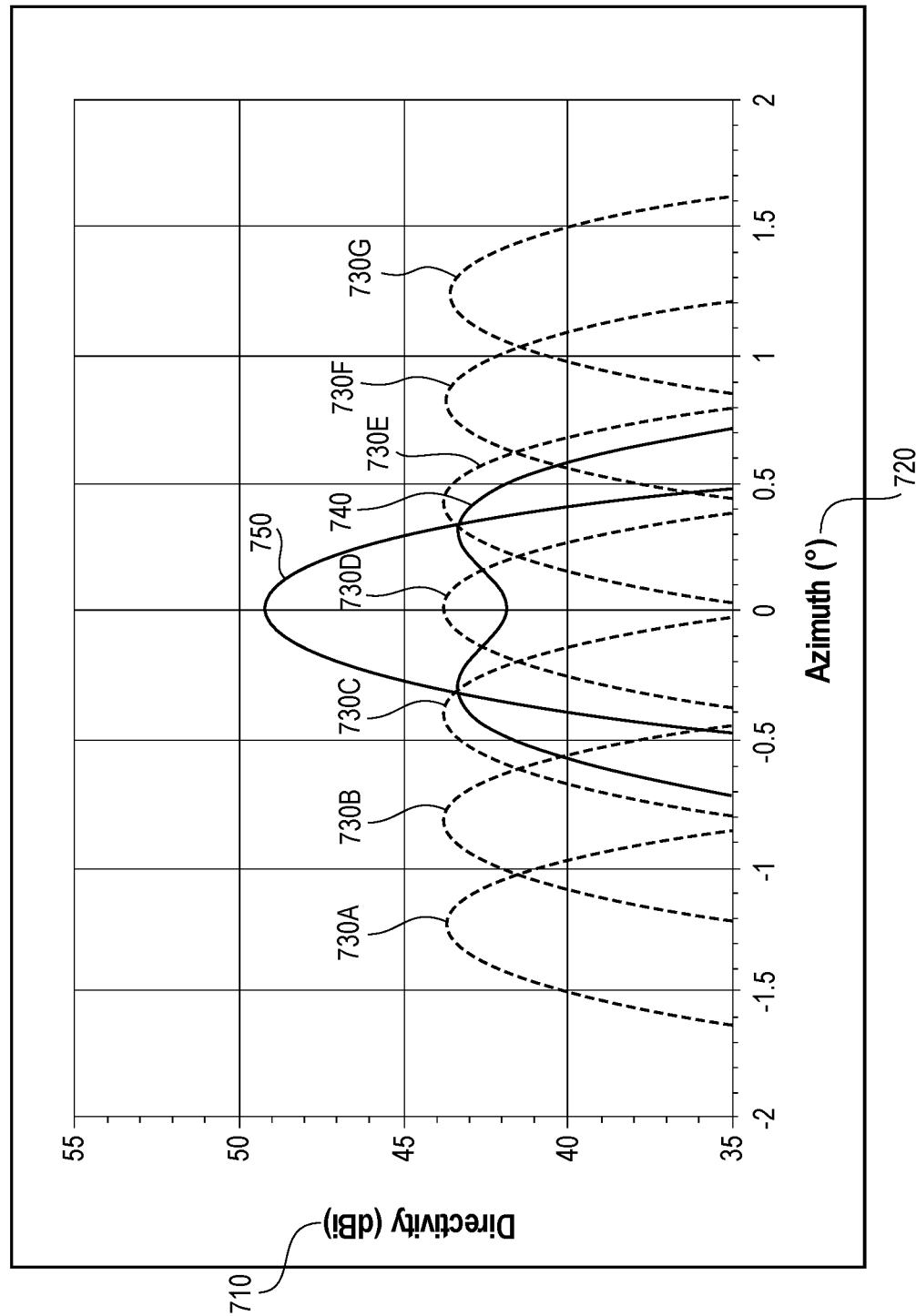
FIG. 7 is a graph plotting directivity of an SRIA system using an integrated dual-band feed array against azimuth angle for synthesized medium gain element beam (MGEB) element beam patterns for the SRIA system for the low frequency band using a first level beam-forming network comprising 7-element beams in the azimuth plane.

FIG. 7 is a graph 700 plotting directivity 710 (in dBi) of an SRIA system using an integrated dual-band feed array against azimuth angle (in degrees) 720 for synthesized medium gain element beam patterns for the SRIA system for the low frequency band using a first level beam-forming network comprising 7 elements per each of seven beams in the azimuth plane. Depicted are seven element beam patterns 730A . . . 730G of the SRIA imaging reflector used to synthesize medium gain element beam (MGEB) 740 at the low frequency band 1, using a first level beam-forming network (BFN). The MGEB 740 has a higher gain than the element beams with an increased efficiency of approximately 50%. A single MGEB at bore-sight and an area coverage beam obtained by combining all 37 element beams through the first level BFN. The exemplary feed array shown in FIG. 2 is used with 37 elements feeding the reflector antenna.

The seven-element beams 730A-730G have a single element per beam in the azimuth plane. The 37 elements of the array are arranged in a hexagonal lattice in order to get better overlap among adjacent beams. The combined MGEB using the seven-element beams in the azimuth plane 730A . . . 730G is plotted as the curve 740, showing that on-axis gain for the bore-sight beam has improved to 49.2 dBi resulting in a moderate first-level BFN antenna efficiency of 50.6%. The associated area beam (1° diameter) by combining all the 37 element beams with appropriate amplitude and phase distribution is shown as the area beam curve 740 with a minimum directivity of 42.2 dBi. Also depicted is the synthesized spot beam 750, which is plotted at boresight location (azimuth angle zero and elevation zero), representing a center of global coverage.

Figure 8:
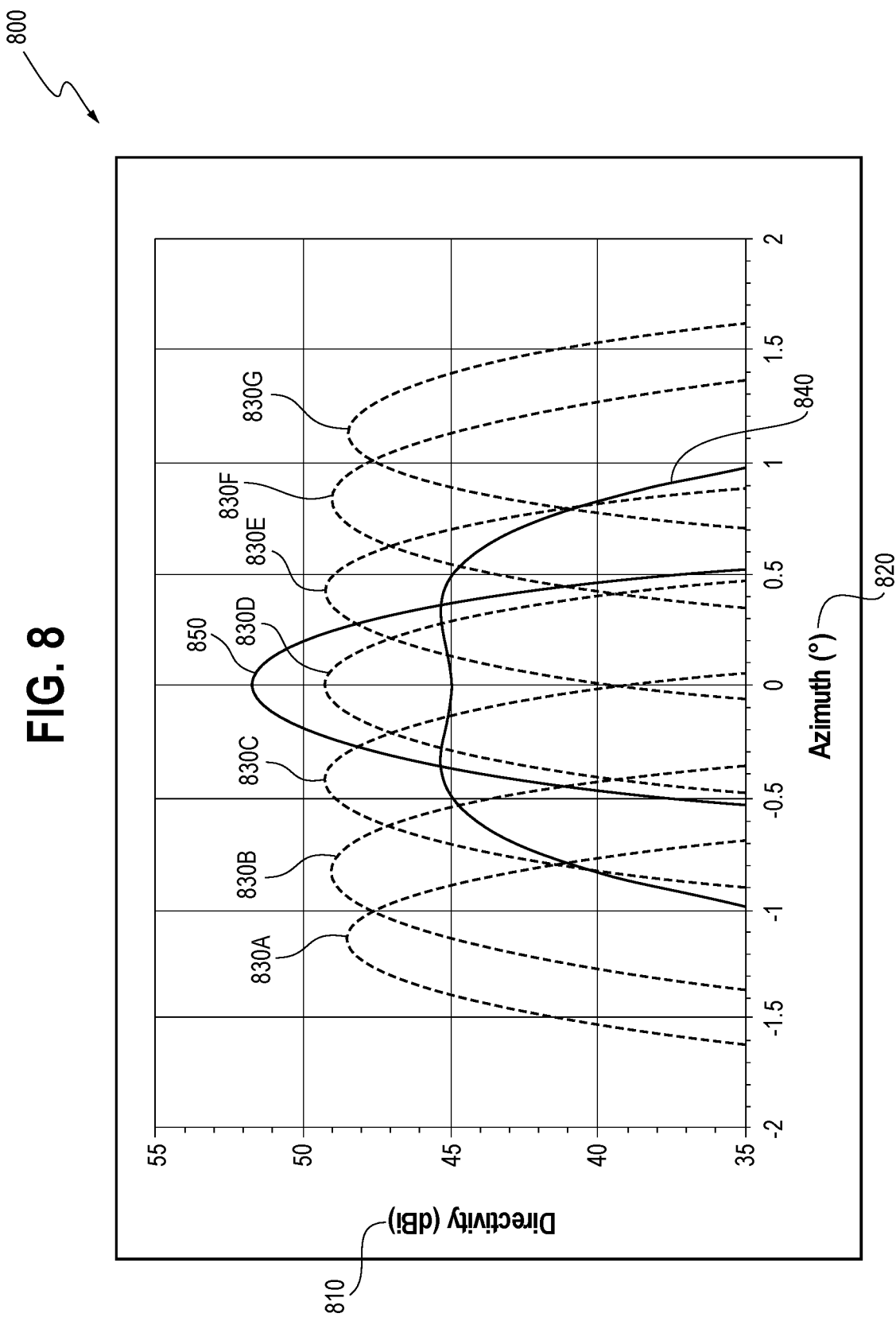
FIG. 8 is a graph plotting directivity of an SRIA system using an integrated dual-band feed array against azimuth for synthesized MGEBs forming exemplary high gain multiple beams (HGMBs) for the low frequency band.

FIG. 8 is a graph 800 plotting directivity 810 (in dBi) of an SRIA system using an integrated dual-band feed array against azimuth (in degrees) 820 for synthesized MGEBs forming exemplary high gain multiple beams (HGMBs) for the low frequency band. Depicted are seven synthesized MGEB patterns 830A . . . 830G of the imaging reflector in the azimuth plane for the low frequency band 1. These MGEBs are then combined through a second level digital BFN to form the HGEB 840. Using two levels of beamforming networks, a single high gain beam at bore-sight and an area coverage beam obtained by combining all the MGEBs through a digital beamforming network (DBFN) for the low frequency band 1. The exemplary feed array shown in FIG. 2 is again used with the 37 elements feeding the reflector antenna.

By combining several of the MGEB beams 830A to 830G, the system generates high gain multiple beams (HGMBs). The generated MGEBs formed through first level BFN are then combined with digital BFN to synthesize the high gain spot beam 840 with 51.4 dBi gain, representing a high antenna efficiency of about 82%. This efficiency is a theoretical maximum that can be achieved with a reflector antenna. The gain increase is approximately 2.2 dB compared to prior art designs and this increase is possible due to illuminating the reflector with optimal illumination and improving the beam overlap among adjacent beams. Also depicted is the coverage beam 850, which achieves a significant increase in gain of about 2.8 dB compared to prior art methods and has a minimum directivity of 45.0 dBi over the 1° diameter. This represents a gain area product of 24837, which is the highest possible for a contoured or shaped beam. This is due to flat gain response over the coverage and sharp fall-off outside the coverage region.

Figure 9:
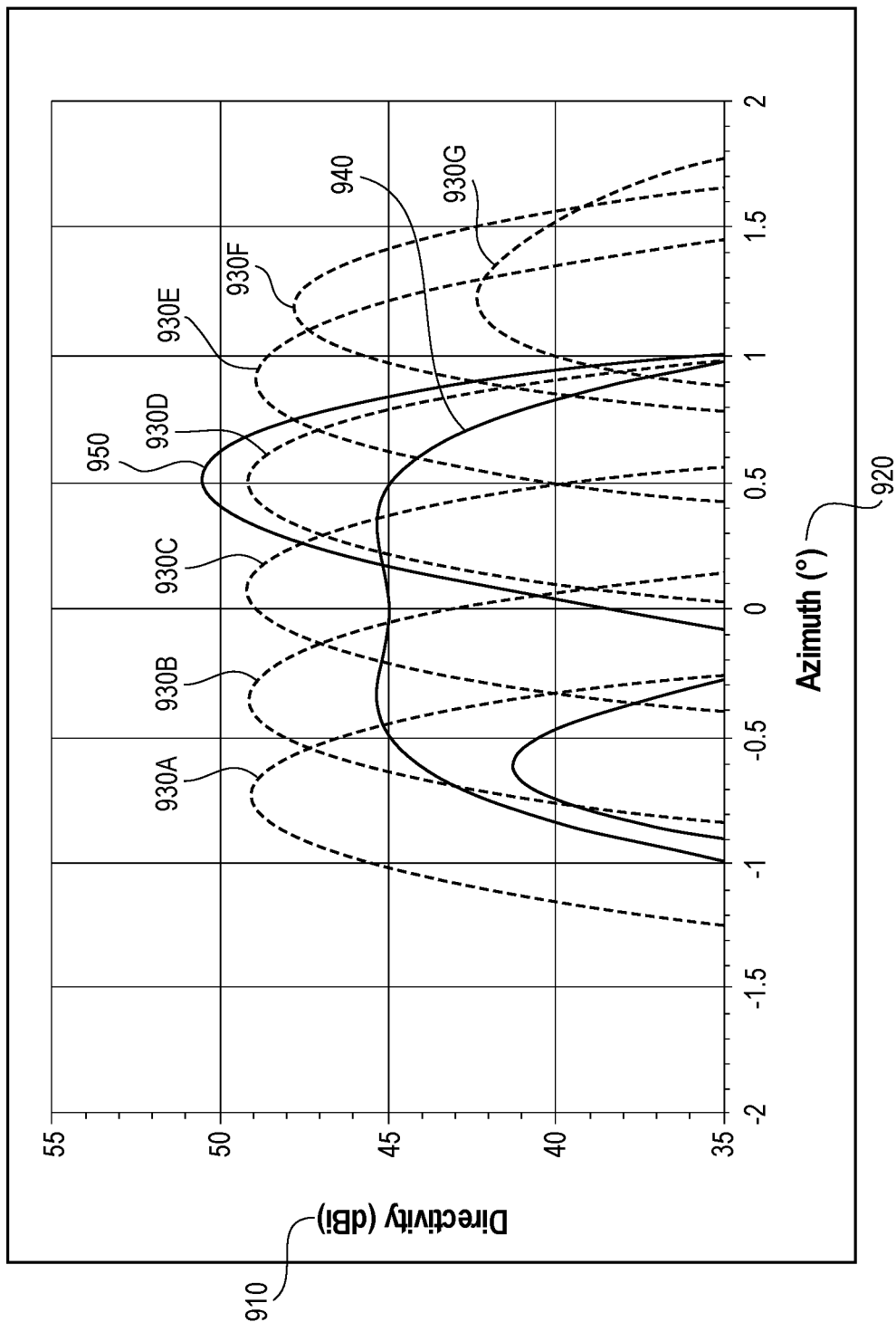
FIG. 9 is a graph plotting directivity of an SRIA system using an integrated dual-band feed array against azimuth angle for synthesized MGEBs forming exemplary HGMBs for the low frequency band when the beams are electronically scanned to 0.5 degrees away from a boresight direction in the azimuth plane.

FIG. 9 is a graph plotting directivity of an SRIA system using an integrated dual-band feed array against azimuth angle for synthesized MGEBs forming exemplary HGMBs for the low frequency band when the beams are electronically scanned to 0.5 degrees away from a boresight direction in the azimuth plane.

FIG. 9 is a graph 900 plotting directivity 910 (in dBi) of an SRIA system using an integrated dual-band feed array against azimuth angle (in degrees) 920 for synthesized MGEBs 930 forming exemplary high gain multiple beams (HGMBs) 940 for the low frequency band when the beams are electronically scanned to 0.5 degrees away from a boresight direction in the azimuth plane. The 37 elements of the array are again arranged in a hexagonal lattice in order to get better overlap among adjacent beams. FIG. 9 shows synthesized MGEB patterns of seven beams 930A . . . 930G of the imaging reflector using first-level beamforming networks and a single HGEB synthesized using a second-level BFN in the azimuth plane. FIG. 9 further shows the single high gain beam scanned to 0.5 degrees from bore-sight. The exemplary feed array shown in FIG. 2 is again used with the 37 elements feeding the reflector antenna. All element beams are effectively used to generate a spot beam and a beam having larger coverage.

Also depicted are the synthesized HGEB patterns 940, which are electronically scanned to 0.5 degrees from the boresight in the azimuthal direction. The directivity is plotted as a function of the azimuth angle. FIG. 9 also shows a 1-degree wide area coverage beam 950 at the bore-sight direction obtained by combining the MGEBs through a second-level digital BFN for the low frequency band 1. FIG. 9 is similar to FIG. 8 except that all the beams including the MGEBs, and the HGEBs are scanned to 0.5° away from the boresight in the azimuthal direction.

Figure 10:
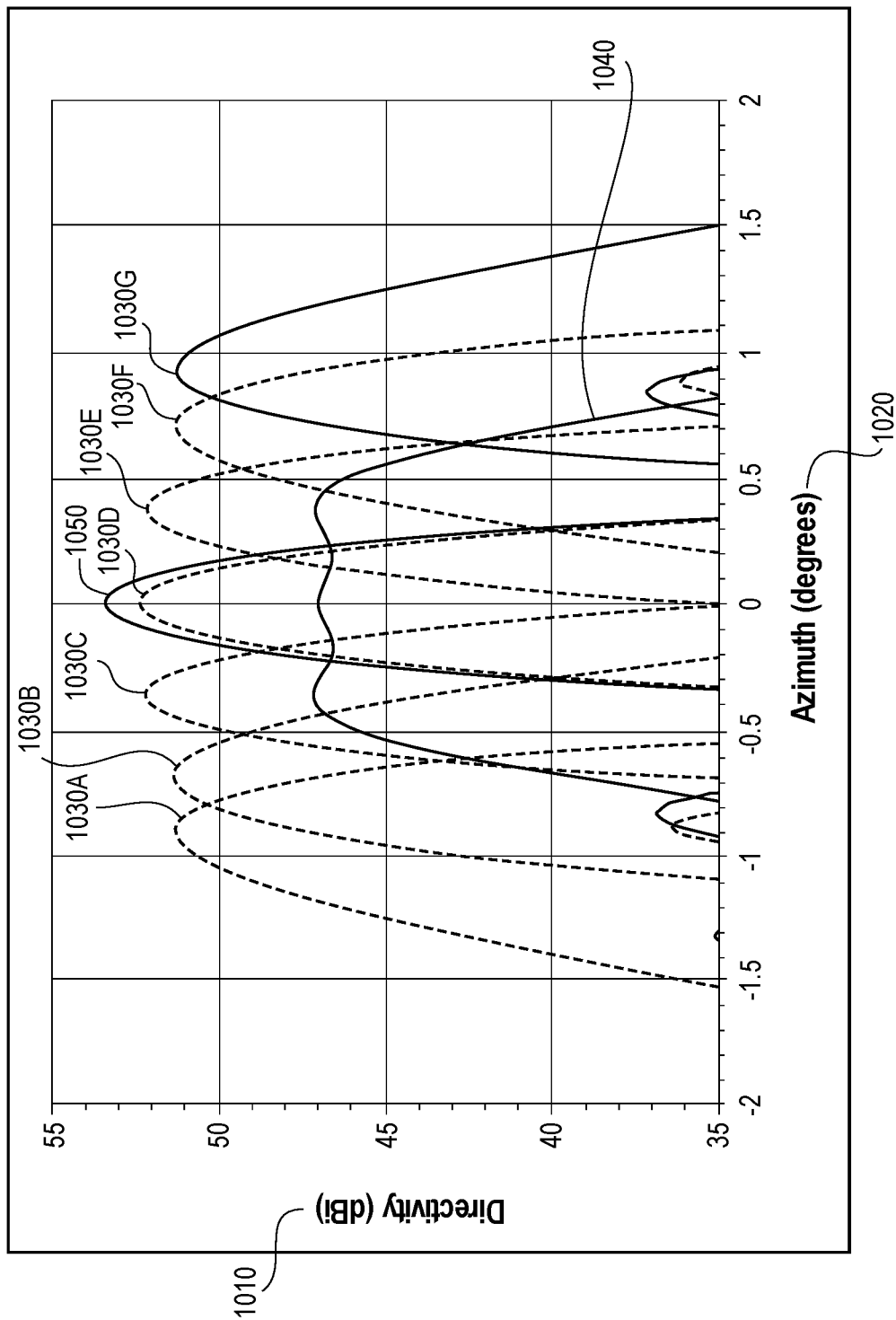
FIG. 10 is a graph plotting directivity of a SRIA system using an integrated dual-band feed array against azimuth for synthesized element beam patterns for HGMBs for the high frequency band and a larger coverage beam.

FIG. 10 is a graph 1000 plotting directivity 1010 (in dBi) of an SRIA system using an integrated dual-band feed array against azimuth (in degrees) 1020 for synthesized MGEBs, for HGEBs and for wider coverage beam patterns for the high frequency band. The 37 elements of the array are again arranged in a hexagonal lattice in order to get better overlap among adjacent beams. FIG. 10 shows synthesized MGEB patterns 1030A . . . 1030G of the imaging reflector in the azimuth plane using a first-level beamforming network, a single high gain beam 1040 at bore-sight and an area coverage beam 1050 obtained by combining the MGEBs through a second-level digital BFN for the high frequency band 2. FIG. 10 is the equivalent of FIG. 8 for the high frequency band 2. The exemplary feed array shown in FIG. 2 is again used with the 37 elements feeding the reflector antenna. All element beams are effectively used to generate a spot beam and a beam having larger coverage.

Also depicted is the synthesized coverage beam 1040, which is plotted at boresight location (azimuth zero and elevation zero), representing a center of global coverage. Also depicted is a larger beam 1050 having an approximate 1° diameter coverage approximately centered at the bore-sight direction.

The results shown in FIG. 10 are achieved due to electronic combining through digital BFN using one or more of amplitude controls and phase controls. The MGEBs overlap well, allowing a spot beam to form and creating HGEBs and coverage beams with increased gain values.

Figure 11:
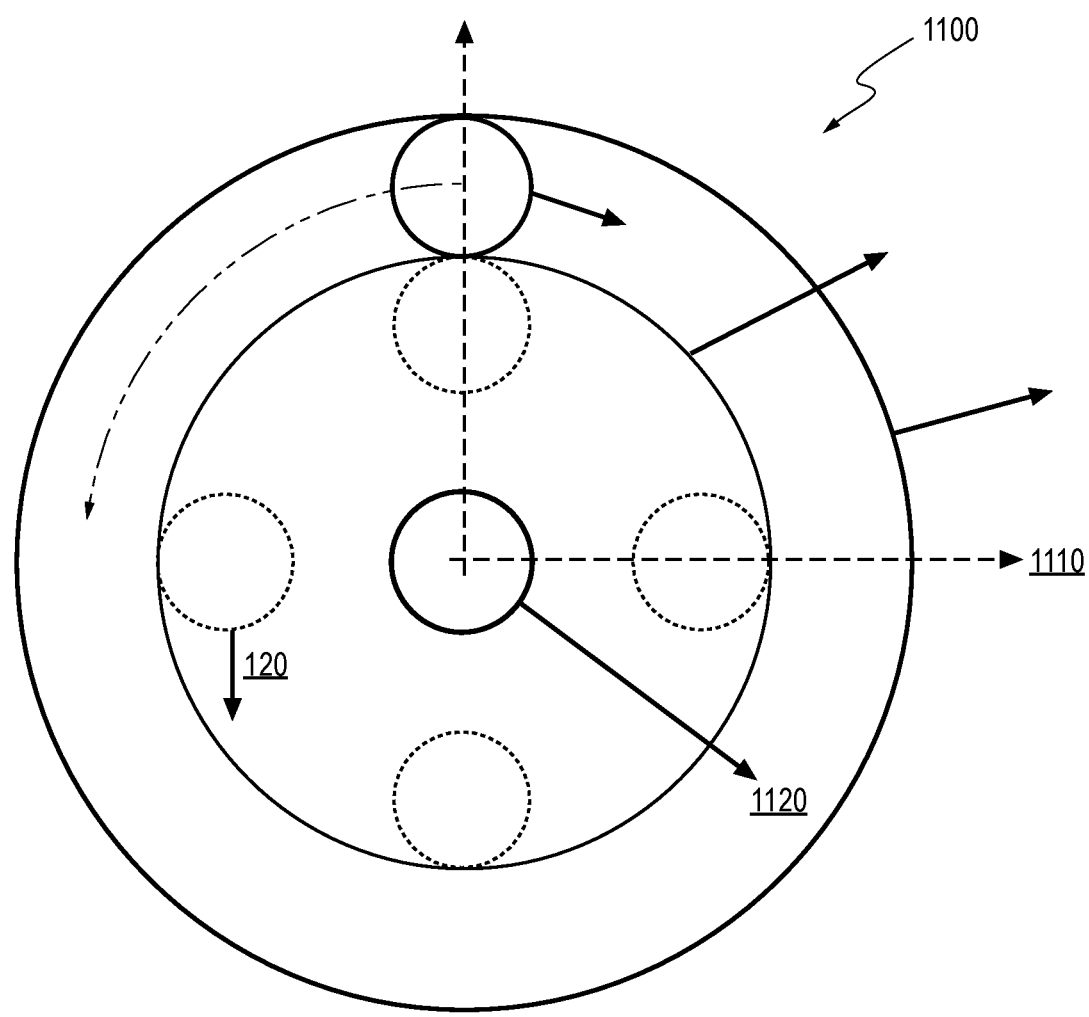
FIG. 11 is an illustration of a hybrid scanning method.

FIG. 11 is an illustration of a hybrid scanning method 1100. In this exemplary drawing, mechanical scanning of the reflector using a two-axis gimbal mechanism (not shown here; illustrated in FIG. 12) is performed over a larger outer circle 1110 while keeping the feed array 120 stationary. The depicted outer circle 1110 has a diameter of approximately 17.4 degrees, as appropriate for global coverage from a geostationary orbit satellite. This hybrid scanning method 1100 provides wider coverages with a limited number of elements (37 in this case), reducing the complexity and cost while simultaneously providing high gain element beams and larger coverage beam. Once the antenna is scanned using the two-axis gimbal mechanisms coarsely to the desired location over earth, then precise electronic scanning is used to place the beams in the exact desired location. In addition, precise electronic scanning is performed of beams over a 1 degree diameter circle 1120 to fine-tune the location of beams on the ground.

Figure 12:
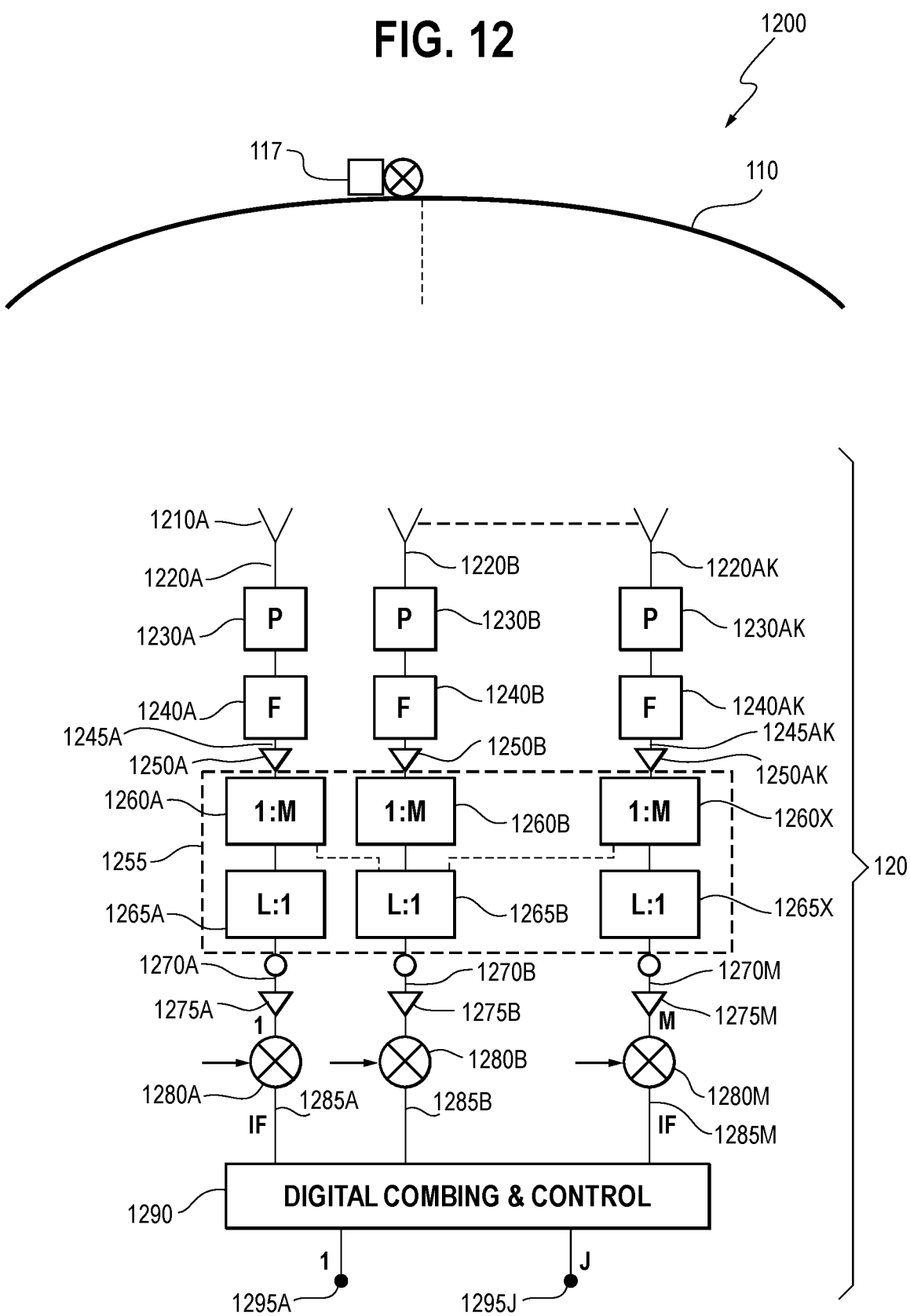
FIG. 12 is a schematic diagram of components of the SRIA system.

FIG. 12 is a schematic diagram of components of the SRIA system 1200. The SRIA system 1200 further comprises the reflector antenna 110. A two-axis gimbal mechanism 117 is placed on a back of the reflector antenna 110. The SRIA system 1200 further comprises the feed array 120. The feed array 120 comprises a small array of N horns 1210A . . . 1210AK (H=about 37). Each horn illuminates the reflector antenna 110 to form a corresponding element beam 1220A . . . 1220AK. The element beams 1220A . . . 1220AK use a single horn 1210A . . . 1210AK per beam 1220A . . . 1220AK and hence do not require any BFN. The element beams 1220A . . . 1220AK have a low efficiency of about 15% since the illumination over the reflector antenna 110 is not optimum. The feed array 120 further comprises a corresponding polarizer 1230A . . . 1230AK configured to convert linear polarization to a desired circular polarization. For example, the desired circular polarization comprises right-hand circular polarization (RHCP) or left-hand circular polarization (LHCP).

The feed array 120 further comprises a small array of N filters 1240A . . . 1240AK. For example, the filters 1240A . . . 1240AK comprise bandpass filters (BPFs) 1240A . . . 1240AK. The N bandpass filters (BPF) pass desired frequencies with minimal loss while rejecting unwanted frequency bands, producing LGEBs 1245A . . . 1245AK with beam efficiency values of approximately 15%.

The feed array 120 further comprises a small array of N low noise amplifiers (LNAs) 1250A . . . 1250AK. The N LNAs 1250A . . . 1250AK pass the respective signals to the first-level RF BFN 1255.

The feed array 120 further comprises a first level radio frequency (RF) BFN 1255. The feed array 120 further comprises dividing networks 1260A . . . 1260X. The feed array 120 further comprises combining networks 1265A . . . 1265Y. After passing through the BPF's 1240A . . . 1240AK and the LNAs 1250A . . . 1250AK, the signal is divided into M components. M equals a number of beams required, for example, approximately or exactly, M=19. L is a number of horns that are combined to form an MGEB using one or more of the combining networks 1265A . . . 1265Y. For example, typically, but not necessarily, L=7. Then signals from L adjacent elements are combined through the M dividing networks to form M medium gain beams 1270A . . . 1270M. For example, as depicted, dividing networks 1260A and 1260X combine to feed into combining network 1265B. For example, the M MGEBs 1270A . . . 1270M have representative 1st level beamforming with beam efficiency values of approximately 50%.

The feed array 120 further comprises a small array of M post-first level BFN amplifiers 1275A . . . 1275M. The feed array 120 further comprises a small array of M local oscillator (LO)/mixers 1280A . . . 1280M. The post-first level BFN amplifiers 1275A . . . 1275M pass the respective signals to the M LO/mixers 1280A . . . 1280M. Emerging from the M LO/mixers 1280A . . . 1280M are M first level beams 1285A . . . 1285M intermediate frequency (IF) beams.

The M beams 1285A . . . 1285M are downconverted IF beams 1285A . . . 1285M. The feed array 120 further comprises a second level digital BFN 1290 that synthesizes and forms J outgoing second level HGEBs 1295A . . . 1295J. Typically, but not necessarily J is a number ranging between 7 to 19.

The outgoing HGEBs 1295A . . . 1295J are high gain beams with an efficiency of approximately 80%. The outgoing second level beams 1295A . . . 1295J can be used as one or more of spot beams and large coverage beams. These outgoing second level beams 1295A . . . 1295 are moved around the global coverage area using the two-axis gimbal mechanisms located on the back of the reflector.

Figure 13A:
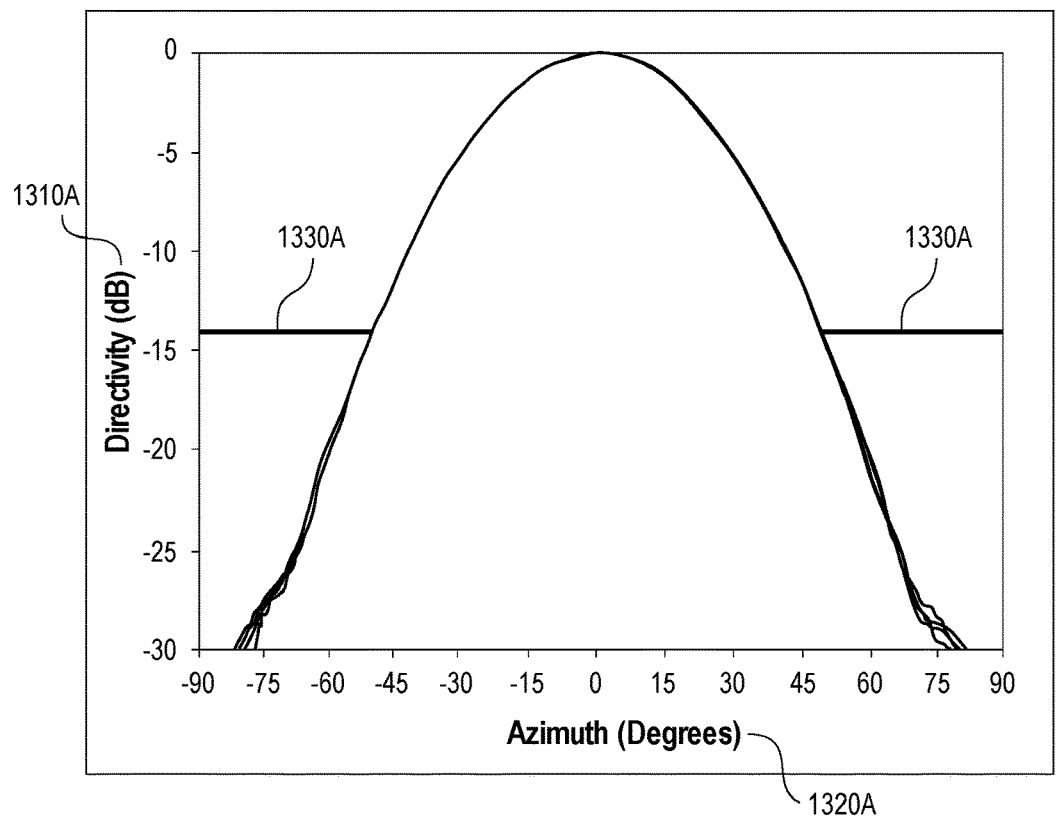
FIGS. 13A-13B are a set of two graphs plotting directivity of the SRIA system using an integrated dual-band feed array against azimuth in two frequency bands for the HGEB when all 37 feed elements are used to illuminate the reflector using a first level beamforming network (BFN) and a second level BFN.
Figure 13B:
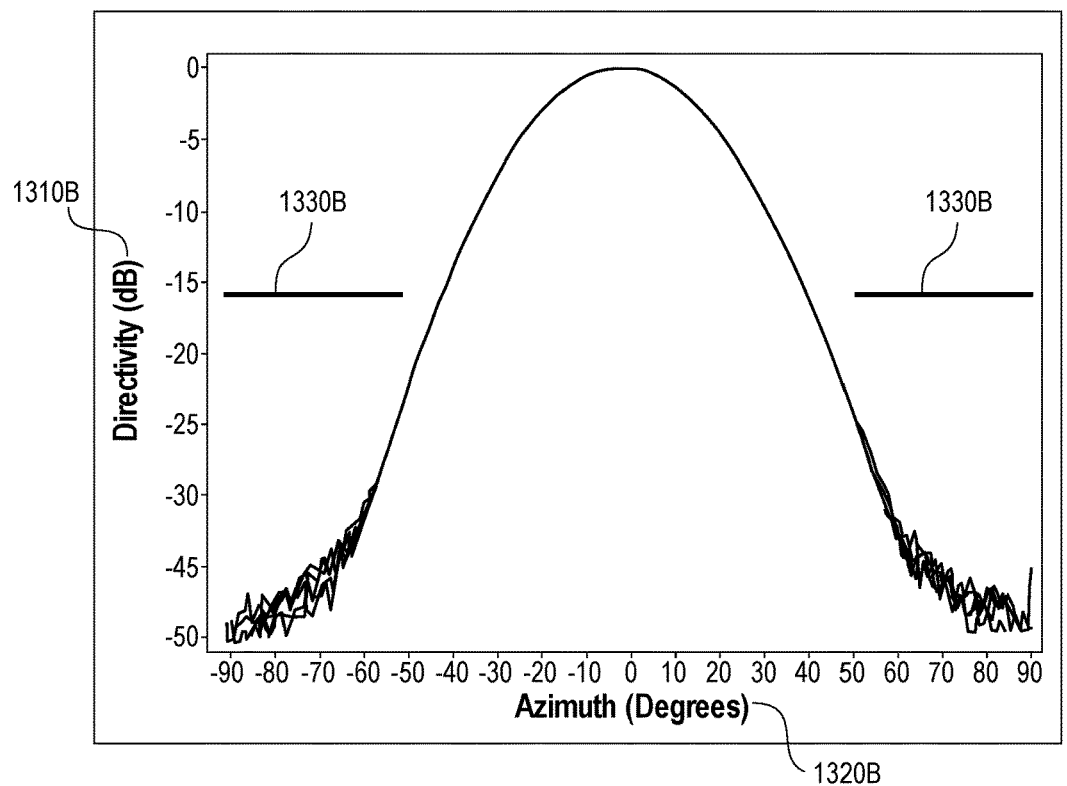

FIGS. 13A-13B are a set of two graphs plotting directivity 1310A, 1310B (in dBi) of the SRIA system using an integrated dual-band feed array against azimuth (in degrees) 1320A, 1320B in two frequency bands for the HGEB when all 37 feed elements are used to illuminate the reflector using a first level beamforming network (BFN) and a second level BFN. FIG. 13A plots feed patterns at a low frequency 30.0 GHz. FIG. 13B plots feed patterns at a high frequency 45.5 GHz. Also included are lines 1330A, 1330B indicating a required minimum edge taper at the reflector-illuminated edge angle. As depicted, the required minimum age taper of greater than 12 dB was easily satisfied at both frequency bands according to embodiments of the invention. Electronic scanning of feed array is used over a limited region of approximately 1 degree radius as shown in FIG. 12. FIGS. 13A-13B show edge taper, meaning a reduction in electrical fields generated by a single horn element at an edge of the reflector relative to the center of the reflector.

III Dual Reflector Imaging Antenna (DRIA)

Other embodiments of the invention for employ a center-fed main reflector geometry having a large focal length F/D of approximately 0.4. A sub-reflector is used to scatter RF energy from the feed array to the main reflector and eventually into free space after reflection from the main reflector. High gain beams are formed using this antenna using a digital BFN allowing electronically scanned beams over certain region, 8.7° or 12° for example. For example, a representative scan comprises approximately 8.7° for geostationary (GEO) satellites and approximately 12° for medium earth orbit global positioning satellite (GPS) satellites.

The feed array is defocused by 7.5" towards the sub-reflector to improve adjacent beam overlap needed to synthesize a global coverage beam. A PIM-free honeycomb panel is used as an interface between the radiating element and the triplexer, depicting the ground-plane of the larger array. Measured radio frequency (RF) performance of the integrated element with triplexer is summarized in Table 1. The feed array comprises a novel seven-element array. Each element has a diameter of approximately 7.5" and is integrated with a compact triplexer that separates each of the three bands with high isolation. A minimum efficiency of 95% has been measured. The system shows excellent power handling with a minimum multipaction margin of 13 dB.

TABLE I

L Band FEED ARRAY Performance

| Parameter | Unit | Performance |
| --- | --- | --- |
| Frequency Band1 | MHz | 1558-1594 |
| Frequency Band2 | MHz | 1211-1245 |
| Frequency Band3 | MHz | 1163-1191 |
| Passive Intermodulation with TX1: 25 W at 1243 MHz (Band 2) TX2: 44 W at 1575 MHz (Band 1) RX: 332 MHz | dBm | PIM <−130 |
| Polarization | — | RHCP |
| Return Loss | dB | 19 |
| Insertion Loss, Band1 | dB | 0.45 |
| Insertion Loss, Band2 | dB | 0.47 |
| Insertion Loss, Band3 | dB | 0.54 |
| Rejection | dB | >45 dB among bands |
| Axial Ratio | dB | <1.0 dB |
| Aperture Efficiency | % | 95 |
| Power Handling, Average | W | 88 (AVG) |
| Minimum Multipaction Margin to 88 W | dB | 13 |
| RF Interface | — | TNC Female |
| Temperature Range | ° C. | −20 to +100 |

Measured insertion loss is no worse than approximately 0.54 dB. The phase center is stable over the band within 0.1", resulting in very low group delay variation over the frequency bands, an important parameter for navigational payloads. For example, the triplexer comprises comb-line filters.

A compact dual-reflector imaging antenna (DRIA) using a center-fed Gregorian antenna is used at GPS bands to provide beam flexibility at L1, L2 and L5 bands covering about 31% bandwidth. The DRIA employs a 4 m deployable mesh reflector and a shaped elliptical sub-reflector of 0.78 m diameter. An exemplary dual reflector antenna employs a center-fed offset parabolic reflector having an approximate projected diameter of the circular aperture of the reflector of 4.0 m. This antenna works at three distinct frequency bands at L-band for global positioning satellite (GPS) constellation at medium earth orbit (MEO).

FIG. 14 is a drawing of components of a dual reflector imaging antenna (DRIA) system 1400.

The DRIA system 1400 comprises a main reflector 1410 that uses a Cassegrain antenna configuration. The main reflector 1410 has a main reflector focus 1415. For example, the main reflector 1410 comprises a 4 meter diameter parabolic reflector having a focal length of 1.7 m. The DRIA system 1400 further comprises a sub-reflector 1420. For example, the sub-reflector 1420 is hyperbolic in shape. For example, the sub-reflector 1420 has a hyperboloid shape. For example, the sub-reflector 1420 has a diameter of approximately 0.78 meters. A focal point of the sub-reflector 1420 is positioned at the main reflector focus 1415 of the main reflector 1410. The primary sub-reflector focal point 1425 of the sub-reflector 1420 is located as shown.

The DRIA system 1400 further comprises a feed array 1430. The feed array 1430 comprises seven feed elements 1440A-1440G. For example, the feed elements 1440A-144G comprise stepped-aperture integrated radiator (STAIR) feed elements 1440A-1440G. For example, the feed elements 1440A-1440G have diameters of approximately 8". For example, and as depicted, the feed elements 1440A-1440G are arranged in a generally hexagonal grid. The main reflector focus 1415 is located on an other side of the sub-reflector 1420 relative to the feed array 1430.

The feed array 1430 further comprises a polarizer (not shown). At least one of the elements 1440A-1440G comprises a triplexer (not shown). Preferably, each element 1440A-1440G comprises a triplexer (not shown). The triplexer is configured to separate three frequency bands L1, L2 & L5 with sufficient isolation between them.

The feed array 1430 is displaced from the primary sub-reflector focal point 1425 of the subreflector by a feed array defocus distance 1450. The feed array 1430 is moved closer to the sub-reflector 1420 and away from the primary sub-reflector focal point 1425 in order to create imaging optics. The feed array defocus distance 1450 is approximately 7.5". Due to the limited number of feed elements 1440A-1440G, only one level of beam forming network is needed in this system.

Figure 15:
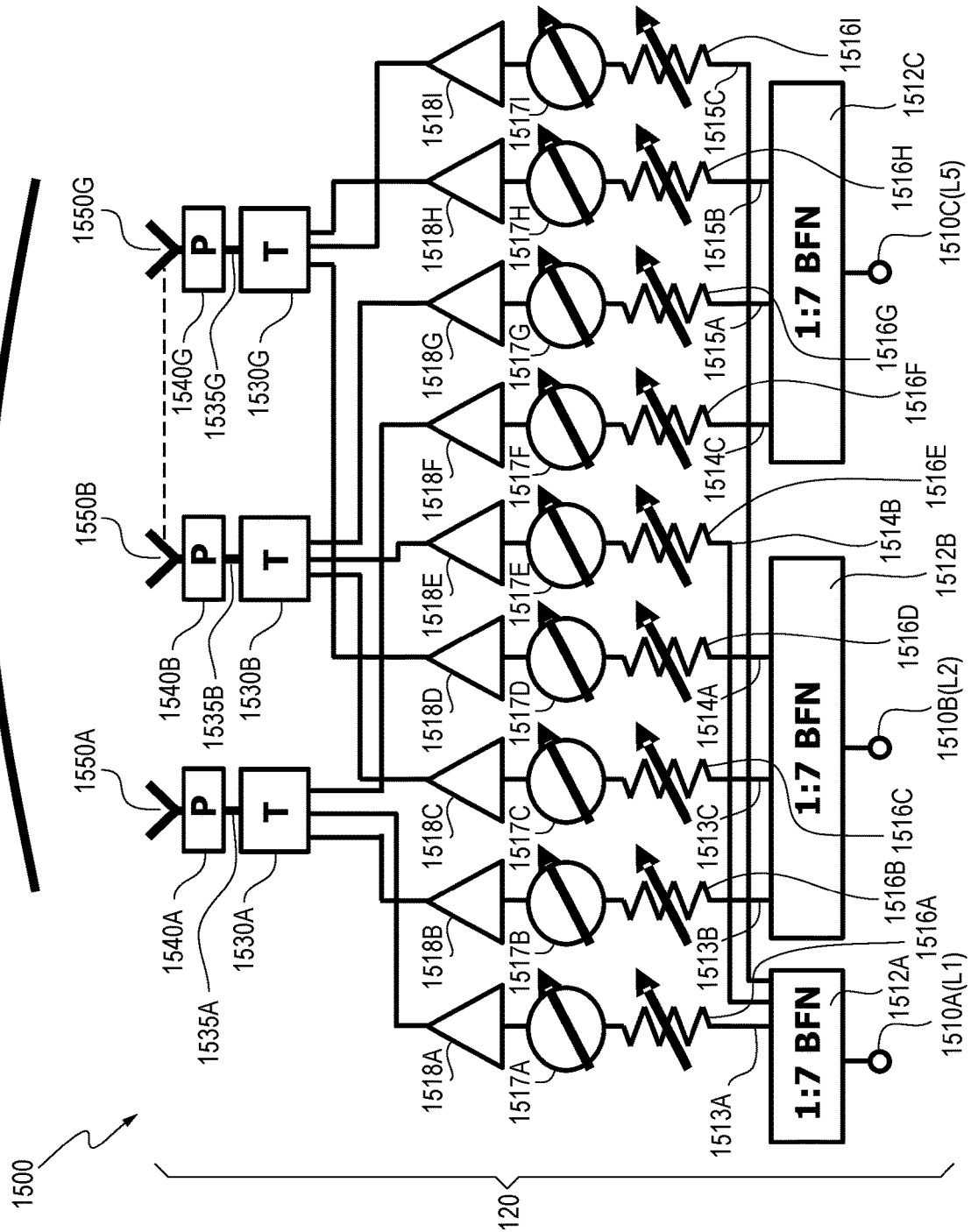
FIG. 15 is a schematic diagram of components of the Dual Reflector Imaging Antenna (DRIA) system.

FIG. 15 is a schematic diagram of components of the Dual Reflector Imaging Antenna (DRIA) system 1500. The DRIA system 1500 further comprises the reflector antenna 110. The reflector antenna 110 have been described in FIGS. 1-14 and comprises a main antenna and a sub-reflector, which are not separately shown in the figure. The DRIA system 1500 further comprises the feed array 120. In this example, N=7.

The feed array 120 comprises tri-band feed elements 1510A, 1510B, 1510C respectively covering the three GPS bands L1, L2 and L5 with an overall bandwidth of approximately 31%. The GPS bands 1510A, 1510B, 1510C comprises radio frequency (RF) signals 1510A, 1510B, 1510C. At input, each of the three bands 1510A (L1), 1510B (L2) and 1510C (L5) passes through a respective 1:7 dividing beamforming network (BFN) 1512A, 1512B, 1512C, generating seven L1 RF signals 1513A . . . 1513G, seven L2 RF signals 1514A . . . 1514G, and seven L5 RF signals 1515A . . . 1515G. In an alternative embodiment to the depicted one, the BFN 1512A, 1512B, 1512C comprises a digital BFN configured to provide one or more of inherent amplitude control and inherent phase control. In this alternative embodiment, the digital BFN comprises a local oscillator and an up-converter configured to transform digital signals at baseband to RF signals at one or more of L1, L2 and L5 frequencies.

The seven divided L1 signals 1513A, 1513B . . . 1513G, the seven divided L2 signals 1514A, 1514B . . . 1514G, and the seven divided L5 signals 1515A, 1515B . . . 1515G each pass to a respective one of seven total variable attenuators 1516A, 1516B . . . 1516G configured to attenuate the respective signals. The seven divided L1 signals 1513A, 1513B . . . 1513G, the seven divided L2 signals 1514A, 1514B . . . 1514G, and the seven divided L5 signals 1515A, 1515B . . . 1515G together comprise a total of 3N or 21 divided signals. Each of the 21 divided signals then pass to a respective one of 21 total variable attenuators 1516A . . . 1516G configured to attenuate the respective signal, and each of the divided signals 1513A, 1513B . . . 1513G, 1514A, 1514B . . . 1514G, 1515A, 1515B . . . 1515G then pass to a respective one of 21 total phase shifters 1517A . . . 1517G configured to do one or more of scan the respective beam and shape the respective coverage beam, and finally each of the 21 divided signals 1513A, 1513B . . . 1513G, 1514A, 1514B . . . 1514G, 1515A, 1515B . . . 1515G pass through one of 21 total respective solid state power amplifiers (SSPAs) 1518A, 1518B . . . 1518G.

After passing through the respective SSPAs 1518A, 1518B . . . 1518G, each of the 21 divided signals 1513A, 1513B . . . 1513G, 1514A, 1514B . . . 1514G, 1515A, 1515B . . . 1515G then pass into one of seven triplexers 1530A, 1530B . . . 1530G. The triplexers 1530A . . . 1530G are each respectively configured to combine three transmitting RF signals from 3 SSPAs, corresponding to L1, L2 and L5, and to combine them into a common port inside the respective triplexers 1530A, 1530B . . . 1530G before feeding the now combined signals 1535A, 1535B . . . 1535G to the integrated radiating element with septum polarizer. The triplexers 1530A, 1530B . . . 1530G provide combined wideband signals with sufficient isolation (typically greater than 70 dB) among RF signals at one or more of L1, L2 and L5 frequencies. The triplexers 1530A, 1530B . . . 1530G provide a good impedance match of typically more than 20 dB at each of three input ports and at the common output port.

For example, triplexer 1530A combines RF L1 signal 1530A, RF L2 signal 1514A, and RF L5 signal 1515A, combining these three signals into a common port inside the triplexer 1530A before feeding the now combined signal 1535A to the polarizer 1540A and then on to radiating element 1550A. The polarizers 1540A, 1540B . . . 1540G are implemented using a septum design. For example, respective orthogonal Left Hand Circular Polarization (LHCP) ports of the septum polarizers 1540A, 1540B . . . 1540G are internally terminated with a coaxial load in order to improve one or more of return loss and axial ratio. For example, the polarizers 1540A, 1540B . . . 1540G convert the respective linearly polarized RF signals 1535A, 1535B . . . 1535G to Right Hand Circular Polarization (RHCP) signals 1550A, 1550B . . . 1550G. The system 1500 thereby simultaneously forms a high gain scanning spot beam over the globe and a large global coverage beam simultaneously.

Figure 16:
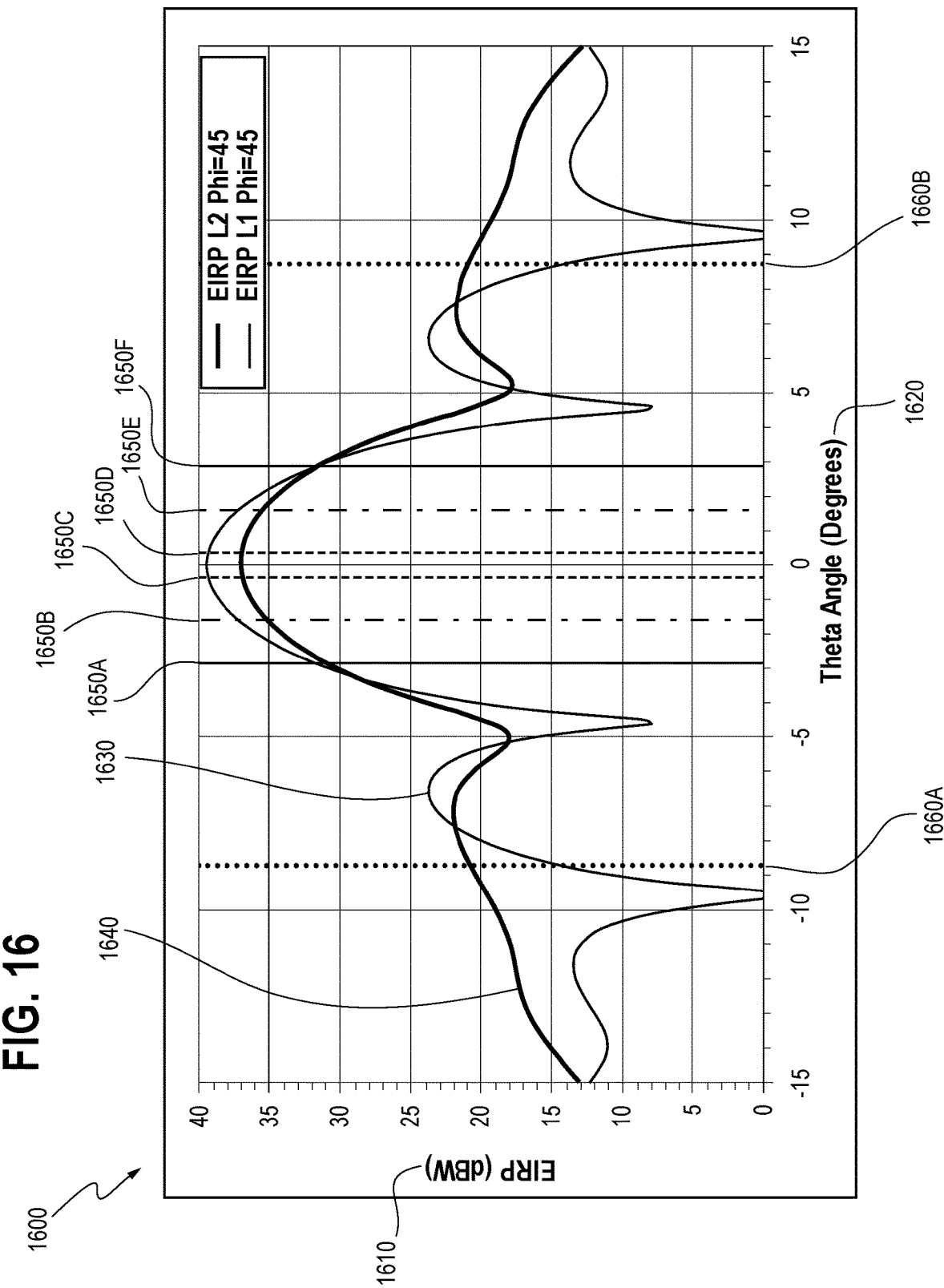
FIG. 16 is a graph 1600 plotting Effective Isotropic Radiated Power (EIRP) against theta angle of spot beams in the boresight direction formed by a DRIA system from a geo-stationary satellite.

FIG. 16 is a graph 1600 plotting Effective Isotropic Radiated Power (EIRP) 1610 (in decibel watts [dBW]) against theta angle (in degrees) 1620 of spot beams in the boresight direction formed by a DRIA system from a geostationary satellite. For example, the DRIA system used is the seven-element reconfigurable feed array depicted in detail in FIG. 15.

Shown is the spot beam curve 1630 for the L1 GPS frequency and the spot beam curve 1640 for the L2 GPS frequency. The plot shows normalized EIRPs assuming 1 watt of RF output power for each of the 7 SSPAs at each band. The vertical lines 1650A-1650F show the EIRP at different coverage angles on the ground and the extreme lines 1660A, 1660B indicate the EIRP at the edge of the earth when the beam is looking at the center of earth. The higher EIRP for L1 relative to L2 for the region within the lines 1650A-1650F (and thus for theta between −3 degrees and +3 degrees) is attributable to the higher frequency of the L1 band.

Figure 17:
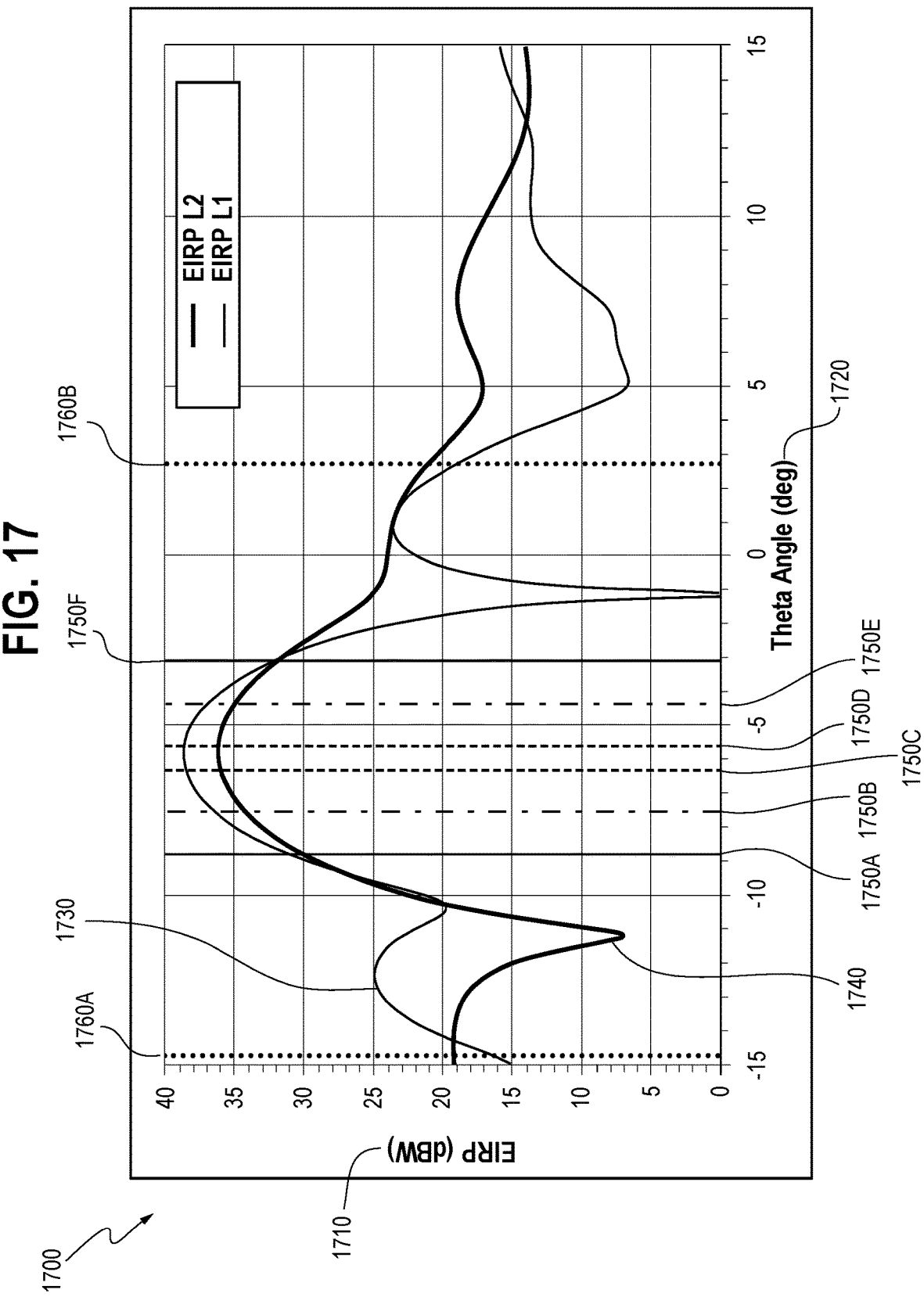
FIG. 17 is a graph plotting EIRP against theta angle of spot beams when the beam is scanned to −6 degrees away from the boresight direction formed by a DRIA system from a geo-stationary satellite.

FIG. 17 is a graph 1700 plotting Effective Isotropic Radiated Power (EIRP) 1710 (in decibel watts [dBW]) against theta angle (in degrees) 1720 of spot beams when the beam is scanned to −6 degrees away from the boresight direction formed by a DRIA system from a geo-stationary satellite. For example, the DRIA system used is the seven-element reconfigurable feed array depicted in detail in FIG. 15. The sub-reflector and feed array are stationary with no moving parts and the required beam flexibility is achieved using the variable attenuators and variable phase shifters of the feed array.

Shown is the spot beam curve 1730 for the L1 GPS frequency and the spot beam curve 1740 for the L2 GPS frequency. The plot shows normalized EIRPs assuming 1 watt of RF output power for each of the 7 SSPAs at each band. The vertical lines 1750A-1750F show the EIRP at different coverage angles on the ground and the extreme lines 1760A, 1760B indicate the EIRP at the edge of the earth when the beam is looking at the center of earth. The higher EIRP for L1 relative to L2 for the region within the lines 1750A-1750F (and thus for theta between −9 degrees and −3 degrees) is attributable to the higher frequency of the L1 band.

In an alternative DRIA embodiment, the main reflector can employ a two-axis gimbal mechanism similar to the one described above for SRIA systems to extend the range of scanning for one or more of medium earth orbit (MEO) satellites and low earth orbit (LEO) satellites. In this set of embodiments, while keeping one or more of the feed array and the sub-reflector stationary, the main reflector is moved independently in one or more of the azimuth direction and the elevation direction. Coarse scanning is achieved through mechanical scanning of the main reflector while precise electronic scanning is achieved using the feed array.

FIG. 18 is a flow chart of a method 1800 for beam scanning.

The order of the steps in the method 1800 is not constrained to that shown in FIG. 18 or described in the following discussion. Several of the steps could occur in a different order without affecting the final result.

In step 1810, using an antenna system, the system comprising a single reflector imaging antenna (SRIA), and using a feed array comprising a number N of feed elements, the feed array configured to transfer a signal to the antenna, the feed array being defocused from a focal plane of the antenna by a defocus distance, the antenna configured to combine the feed elements to form a number M of medium gain element beams (MGEBs), the antenna further configured to combine the MGEBs to form a number J of high gain element beams (HGEBs), and the system further configured to combine all or some number of MGEBs to form a large coverage beam, using the N feed elements and the antenna, forming N single element beams. Block 1810 then transfers control to block 1820.

In step 1820, using the N feed elements, combining the single element beams. This does not require any beamforming network. Block 1820 then transfers control to block 1830.

In step 1830, M MGEBs are formed using a first-level beamforming network (BFN). Block 1830 then transfers control to block 1840.

In step 1840, the MGEBs are combined in a second-level BFN to create the large coverage beam. Block 1840 then terminates the process.

FIG. 19 is a flow chart of a method 1900 for beam scanning.

The order of the steps in the method 1900 is not constrained to that shown in FIG. 19 or described in the following discussion. Several of the steps could occur in a different order without affecting the final result.

In step 1910, using an antenna system, the system comprising an antenna, the antenna comprising a single reflector imaging antenna (SRIA), the system further comprising a two-axis gimbal mechanism, the system further comprising a feed array configured to transfer a signal to the antenna, the feed array being defocused from a focal plane of the antenna by a defocus distance, the feed array comprising a number N of feed elements, the antenna configured to combine the feed elements to form a number J of high gain element beam (HGEB), the system further configured to combine the HGEBs to form a large coverage beam, precise electronic scanning is performed over a first region, generating the J HGEBs and the large coverage beam. Block 1910 then transfers control to block 1920. For example, the step of performing precise electronic scanning uses an area beam having an approximate diameter of 1°.

In step 1920, coarse mechanical scanning is performed over a second region using the two-axis gimbal mechanism by keeping the sub-reflector and the feed array stationary and gimballing the reflector antenna, wherein the second region is larger than the first region, generating J of second level beams and the large coverage beam. Block 1920 then terminates the process.

Optionally, the method comprises an additional step, performed after the step of performing coarse mechanical scanning, of using the second level beams as one or more of spot beams and large coverage beams.

An advantage of embodiments of the invention is that it provides an improvement of about 2.2 dB relative to prior art approaches. A further advantage of embodiments of the invention is that the number of elements can be reduced significantly by using the hybrid scanning method with electronic scanning of the feed array over a small coverage combined with coarse scanning over larger coverage by gimballing the reflector with a fixed feed array.

The disclosed method has the advantages of realizing high gain multiple as well as shaped beams over a large coverage region using a low-cost imaging reflector antenna design. The beam locations and shapes can be reconfigured on-orbit using a digital beamforming or a combination of analog and digital beamformers depending on the applications. A further advantage includes significant improvements in gain relative to prior art methods that employ element beams. A still other advantage is that embodiments of the invention can simultaneously provide both HGMBs and wide area coverage beams with low cost payloads.

An advantage of embodiments of the invention is that, by combining a number of feed elements with optimized amplitude and optimized phase excitations, embodiments of the invention are usable to create a magnified image, relative to a prior art focal-plane-fed array, in the far-field of the antenna and having broader element beams. A further advantage is that the element beam broadening improves overlap between adjacent beams, allowing a larger feed array to be used for each beam. A still further advantage of embodiments of the invention is that a larger number of feed elements in the array improves efficiency and hence provides higher antenna gain." Embodiments of the invention thereby achieve better overlap among adjacent beams than does the prior art. An advantage of the two-level BFN methodology is that it reduces the number of one or more of inputs to the digital BFN and outputs to the digital BFN and hence significantly reduces one or more of processing complexity and power.

A further advantage of embodiments of the invention is that they provide a reconfigurable beam shape. A yet additional advantage of embodiments of the invention is that the beam shape can be adapted in orbit to handle multiple jammers while providing large theater coverage.

An additional advantage of embodiments of the invention is that they result in very high gain values, with efficiencies of approximately 80%. A further advantage of embodiments of the invention is an improved gain-to-noise-temperature ratio. A still further advantage of embodiments of the invention is improving beam overlap so that the large coverage beams also have increased gain.

A further advantage of embodiments of the invention is that they provide capabilities for one or more of on-orbit beam reconfiguration and beam scanning for satellite antennas. The satellite antennas may be used for one or more of military and commercial communications satellites. The one or more of on-orbit beam reconfiguration and beam scanning promotes operational flexibility to respond if changes occur in one or more of coverage, beam scanning and interference mitigation.

An advantage of embodiments of the invention is that high resolution is achieved over a smaller region and global coverage is achieved by moving the beams over larger coverage by gimbaling the reflector. This is shown by comparison results between embodiments of the invention and the prior art approach.

A further advantage of embodiments of the invention is that relative to the prior art, a small number of elements can achieve desired results. A still further advantage of embodiments of the invention is that they exploit more effectively than the prior art the potential of one or more of a single reflector imaging antenna (SRIA) and a dual-reflector imaging antenna (DRIA).

Another advantage of embodiments of the invention is that the antenna simultaneously produces multiple element beams and lager theater coverage beam. A yet further advantage of embodiments of the invention is that multiple quiescent beams are used to create an adapted beam that do one or more of null a number of interferers and provide higher gain beams.

A yet further advantage of embodiments of the invention is that they provide significant improvements in gain relative to prior art methods that employ element beams. Another advantage apart from the increased gain of HGEBs is that sidelobe levels are much lower due to increased illumination taper on the reflector, thereby greatly improving interference mitigation against jammers.

A still further advantage of embodiments of the invention is that the antenna beams are scanned together, maintaining adjacent beam overlap over global coverage regions while using a hybrid scanning method performing electronic scanning of the feed array over a smaller coverage region. A yet further advantage of embodiments of the invention is that mechanical scanning of the main reflector is performed with a fixed feed array and sub-reflector over a larger coverage region. Another advantage of embodiments of the invention is that the defocus distance H avoids potential gain reduction due to blockage of the feed array illumination on the reflector.

Another advantage of embodiments of the invention is that a Large F/D is chosen to improve scan loss when the beam is electronically scanned. This hybrid scanning has two advantages: (a) minimize the number of elements of the feed array and hence cost, (b) allows beams over wide coverage with low scan loss. This method minimizes the scan loss while reducing the cost by using only a small feed array with 37 elements. The offset clearance of 20" prevents scanned beams from suffering from blockage effects that potentially reduce antenna gain. The hybrid scanning method can be used to scan spot beam and coverage beams over a large global coverage region from a geostationary satellite.

A still further advantage of embodiments of the invention is the medium gain beams reduce the number of inputs to the digital BFN, thereby preventing power requirements for the digital BFN from increasing exponentially with the number of inputs.

An additional advantage of embodiments of the invention is that the hybrid scanning method results in excellent cross-polar performance for both bands of better than approximately 30 dB.

A further advantage of embodiments of the invention is that the DRIA system separates the three frequency bands L1, L2 and L5 with sufficient isolation among them. A yet further advantage of embodiments of the invention is that the DRIA system creates imaging optics in the far-field. A still additional advantage of embodiments of the invention is that the imaging optics allow better overlap among adjacent beams of the 7-element array, forming high gain spot beams with increased efficiency. A still further advantage of embodiments of the invention is that the DRIA system allows combining the seven-element beams to form either a large earth-coverage beam or a spot beam that can be scanned electronically over a desired global coverage. Another advantage of embodiments of the invention is that the DMA system needs only one level of BFN. A yet further advantage of embodiments of the invention is that the shaped hyperboloid sub-reflector profile improves efficiency. Another example of embodiments of the invention is that the use of the phase shifters and attenuators in the DMA system allows independently changing amplitude of the RF signals at each band (L1, L2, and L5). And thereby shaping beam coverage from the ground. Further advantages of the DRIA system include that implementation of the polarizer as a septum design is capable of meeting the desired bandwidth while providing a compact system that is integral to the radiating element. Further advantages of the DRIA system include that implementing the polarizer in the septum design in this system improves one or more of return loss and axial ratio performance. Still further advantages of the DRIA system include that one or more of the triplexers provide combined wideband signals with sufficient isolation (typically greater than 70 dB) among RF signals at one or more of L1, L2 and L5 frequencies. Yet additional advantages of the DRIA system include that one or more of the triplexers provide a good impedance match of typically more than 20 dB at each of three input ports and at the common output port.

It will be understood by those skilled in the art that software used by the method for automatic annotation of a map may be located in any location in which it may be accessed by the system. It will be further understood by those of skill in the art that the number of variations of the network, the location of the software, and the like are virtually limitless. For example, embodiments of the invention can be employed with other reflector geometries including but not limited to one or more of a Cassegrain antenna, a Gregorian antenna, a dual-reflector antenna with an axially displaced ellipsoidal (ADE) sub-reflector, a non-focused single reflector antenna, and so on, while still lying within the disclosed invention.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. An antenna system comprising:
   a single reflector imaging antenna (SRIA), the antenna configured to combine the feed elements to form a high gain element beam (HGEB), the system further configured to combine the HGEBs to form a large coverage beam;
   a two-axis gimbal mechanism placed on a back of the SRIA antenna; and
   a feed array configured to transfer a signal to the antenna, the feed array being defocused from a focal plane of the antenna by a defocus distance, the feed array comprising a number N of feed elements, the feed array further comprising a number N of polarizers, the feed array further comprising a number N of filters, the feed array further comprising a number N of amplifiers, the amplifiers configured to pass the signal to a first level beamforming network (BFN), the first level BFN configured to combine the feed elements to form a number M of medium gain element beams (MGEBs), the feed array further comprising M post-first level BFN amplifiers, the feed array further comprising N local oscillator/mixers, the feed array further comprising a second level digital BFN configured to combine the MGEBs to form a number J of outgoing high gain element beams (HGEBs), the system further configured to combine the HGEBs to form the large coverage beam.

2. The antenna system of claim 1, wherein at least one of the polarizers is configured to convert a linear polarization to a desired circular polarization.

3. The antenna system of claim 2, wherein the desired circular polarization comprises one or more of right-hand circular polarization (RHCP) and left-hand circular polarization (LHCP).

4. The antenna system of claim 2, the system further comprising a two-axis gimbal mechanism configured to gimbal the reflector antenna while keeping the feed array fixed.

5. The antenna system of claim 4, the system configured to perform precise electronic scanning over a small region, the system further configured to perform coarse mechanical scanning over a larger region keeping the feed array fixed and gimballing the reflector antenna using the two-axis gimbal mechanism.

6. The antenna system of claim 1, wherein at least one of the filters comprises a bandpass filter.

7. The antenna system of claim 6, wherein at least one of the amplifiers comprises a low noise amplifier.

8. The antenna system of claim 1, wherein the feed array comprises N horns.

9. The antenna system of claim 8, wherein the system uses a single horn per beam.

10. The antenna system of claim 8, wherein N is approximately equal to 7.

11. An antenna system comprising:
    a dual reflector imaging antenna (DRIA), the system comprising a main reflector, the system further comprising a sub-reflector; and
    a feed array configured to transfer a signal to the antenna, the feed array being defocused from a focal plane of the antenna by a defocus distance, the feed array configured to receive a number N of feed elements, the feed array passing the N signals through a first level beamforming network (BFN), the feed array further comprising a number N of attenuators, the feed array further comprising a number N of phase shifters, the feed array further comprising a number 3N of amplifiers, the feed array further comprising a number N of triplexers, the feed array further comprising a number N of polarizers, the feed array further comprising a number 3N of filters, the feed array further comprising a number 3N of amplifiers, the system further configured to combine the beams to simultaneously form a large global coverage beam and a high gain scanning spot beam.

12. The antenna system of claim 11, wherein the signal comprises a radio frequency (RF) signal.

13. The antenna system of claim 12, wherein the signal comprises one or more of an L1 global positioning satellite (GPS) signal, an L2 GPS signal, and an L5 GPS signal.

14. The antenna system of claim 11, wherein at least one of the polarizers is configured to convert linear polarization to a desired circular polarization.

15. The antenna system of claim 14, wherein the desired circular polarization comprises right-hand circular polarization (RHCP) or left-hand circular polarization (LHCP).

16. The antenna system of claim 11, wherein at least one of the filters comprises a bandpass filter.

17. The antenna system of claim 11, wherein at least one of the amplifiers comprises a power amplifier.

18. The antenna system of claim 11, wherein the large global coverage beam with has an approximate radius of +/−12° for medium earth orbit (MEO) satellites.

19. The antenna system of claim 11, the system further comprising a two-axis gimbal mechanism configured to gimbal the main reflector while keeping the sub-reflector fixed.

20. The antenna system of claim 19, wherein the system extend coverage of one or more of the spot beam and global coverage beam beyond a radius of +/−8.7° for geostationary (GEO) satellites.

* * * * *